US011988318B2

(12) United States Patent
El-Sheimy et al.

(10) Patent No.: US 11,988,318 B2
(45) Date of Patent: May 21, 2024

(54) METHODS AND SYSTEMS TO ENHANCE PIPELINE TRAJECTORY RECONSTRUCTION USING PIPELINE JUNCTIONS

(71) Applicant: Profound Positioning inc., Calgary (CA)

(72) Inventors: Naser El-Sheimy, Calgary (CA); Hussein Ahmed Sahli, Calgary (CA); Adel Mohamed Aly Elsayed Moussa, Calgary (CA)

(73) Assignee: Profound Positioning Inc., Calgary (CA)

( * ) Notice: Subject to any disclaimer, the term of this patent is extended or adjusted under 35 U.S.C. 154(b) by 9 days.

(21) Appl. No.: 15/204,971

(22) Filed: Jul. 7, 2016

(65) Prior Publication Data

US 2017/0138524 A1 May 18, 2017

Related U.S. Application Data

(60) Provisional application No. 62/189,725, filed on Jul. 7, 2015.

(51) Int. Cl.
*F16L 55/48* (2006.01)
*G01C 21/16* (2006.01)
*F16L 101/30* (2006.01)

(52) U.S. Cl.
CPC ............ *F16L 55/48* (2013.01); *G01C 21/165* (2013.01); *F16L 2101/30* (2013.01)

(58) Field of Classification Search
CPC ..... G01C 21/165; F16L 2101/30; F16L 55/48
(Continued)

(56) References Cited

U.S. PATENT DOCUMENTS 4,747,317 A * 5/1988 Lara ................. G01C 21/16
324/220
6,170,344 B1 * 1/2001 Ignagni ............... G01C 21/16
73/865.8
(Continued)

FOREIGN PATENT DOCUMENTS

CN 104235618 A * 12/2014

OTHER PUBLICATIONS

Abstract of CN-104235618-A (English translate), Dec. 2014, 2 pp. (Year: 2014).*
(Continued)

*Primary Examiner* — Toan M Le
*Assistant Examiner* — Xiuqin Sun
(74) *Attorney, Agent, or Firm* — BORDEN LADNER GERVAIS LLP

(57) ABSTRACT

The present embodiments include new methods for low-cost inertial measurement units (IMU) using an extended Kalman filter (EKF) to increase the navigation parameters accuracy or reduce the total RMS errors even during the unavailability of Above Ground Markers (AGM) using new developed method called PipeLine Junctions (PLJ) detection. This method detects the pipeline junctions and adds heading and pitch constraints to the Pipeline Inspection Gauge (PIG) motion between junctions. The results of this such embodiments with a micro-electro-mechanical systems (MEMS) based IMU showed that the position RMS errors have been reduced around 85% of the original applied EKF solution. Therefore, this approach is a useful solution for PIG navigation system.

17 Claims, 23 Drawing Sheets

(58) Field of Classification Search
USPC .......................................................... 702/94
See application file for complete search history.

(56) References Cited

U.S. PATENT DOCUMENTS

| 2011/0139538 A1* | 6/2011 | Hill ........................... G01P 3/14 |
| | | 181/123 |
| 2012/0245839 A1* | 9/2012 | Syed .................... G01C 21/165 |
| | | 701/408 |
| 2016/0055640 A1* | 2/2016 | Menozzi ............ G02B 27/0093 |
| | | 345/633 |

OTHER PUBLICATIONS

NPL_971_1 Search Results, Jul. 24, 2021, 1 pp. (year: 2021).*
NPL_971_2 Search Results, Jul. 24, 2021, 1 pp. (year: 2021).*
Chatterjee et al., MEMS based Inertial Measurement Units for strategic applications, 2015 Symposium on Design Test Integration and Packaging of MEMS and MOEMS (Year: 2015).*

* cited by examiner

METHODS AND SYSTEMS TO ENHANCE PIPELINE TRAJECTORY RECONSTRUCTION USING PIPELINE JUNCTIONS

TECHNICAL FIELD

Embodiments of the invention are directed, in general, pipeline services and systems and, more specifically, to methods and systems to enhance pipeline trajectory reconstruction for pipelines Integrity Monitoring using pipeline junctions.

BACKGROUND

Pipeline Inspection Gauge (PIG) has been used for many years to perform various maintenance operations on a pipeline. Different pipeline parameters can be inspected during the PIG journey. Although, PIG uses many sensors to detect the required pipeline parameters, matching these data with the corresponding pipeline location is considered as a very important parameter.

Pigs are devices/tools that can be inserted into the pipeline and travel throughout the length of the pipeline, driven forward by the differential pressure across the tool. Pigs carry embedded computers and sensors, to acquire information and to perform various maintenance operations in a pipeline. The pigging procedure requires the pipeline contents to be flowing to facilitate the pig's movement. In general, the pig's total journey length can vary from hundreds of meters to hundreds of kilometers. A variety of methods are used for pipeline inspection such as ultrasonic techniques, echo sounding, radiography, and cameras. In the past, the position determination of the pig used to be achieved with a set of velocity wheels (odometers). These wheels provide the longitudinal speed of the pig that can be integrated to provide the distance traveled along the pipeline.

High-end Inertial Measurement Units (IMUs), such as Fiber Optic Gyro (FOG)- and/or Ring Laser Gyro (RLG)-based high-end inertial navigation systems, are used in pigging applications for locating problems in pipelines that have been detected using other sensors, and reconstructing the trajectories of a PIG. These types of IMUs are accurate enough to provide an acceptable solution. However, the drawbacks of these grade of IMUs include large sizes that cannot fit all pipeline sizes and their expensive price. Therefore, high-end IMUs cannot be used in small diameter pipelines (8" or less).

In order to achieve proper maintenance operations, position referencing technique is required to find the exact coordinates of the defected parts detected by a PIG's sensors. Furthermore, it is beneficial to reconstruct the pipeline trajectory in many applications.

SUMMARY

A method to enhance pipeline trajectory reconstruction using pipeline junctions is described. In an embodiment, the method may include collecting sensor data from an inertial sensor onboard a PIG device. The method may also include detecting a pattern in the sensor data indicative of a junction in the pipeline. In a further embodiment, the method may include determining a rate of travel of the PIG device. Additionally, the method may include determining a position of the PIG device within the pipeline in response to the identified junction and the rate of travel of the PIG device.

A system is also described. In an embodiment, the system includes a PIG device. The PIG device may include a Micro-Electro-Mechanical System (MEMS) Inertial Measurement Unit (IMU) or other IMUs onboard PIG device configured to generate sensor data indicative of motion of the PIG device. Additionally, the PIG device may include a processing device coupled to the IMU, the processing device configured to: detect a pattern in the sensor data indicative of a junction in the pipeline, determine a rate of travel of the PIG device, and determine a position of the PIG device within the pipeline in response to the identified junction and the rate of travel of the PIG device.

BRIEF DESCRIPTION OF THE DRAWINGS

Figure 1:
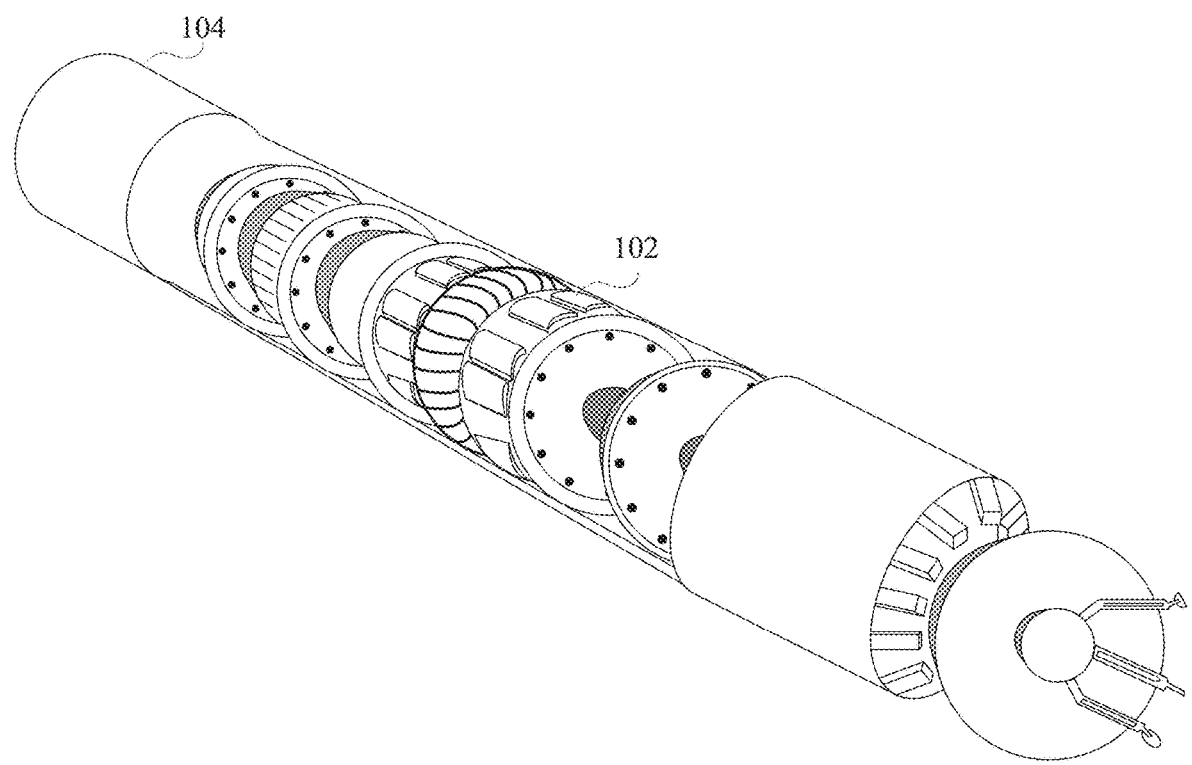

Having thus described the invention in general terms, reference will now be made to the accompanying drawings, which are not necessarily drawn to scale, and wherein:

FIG. 1 is an illustration of a PIG tool inside a pipeline.

Figure 2:
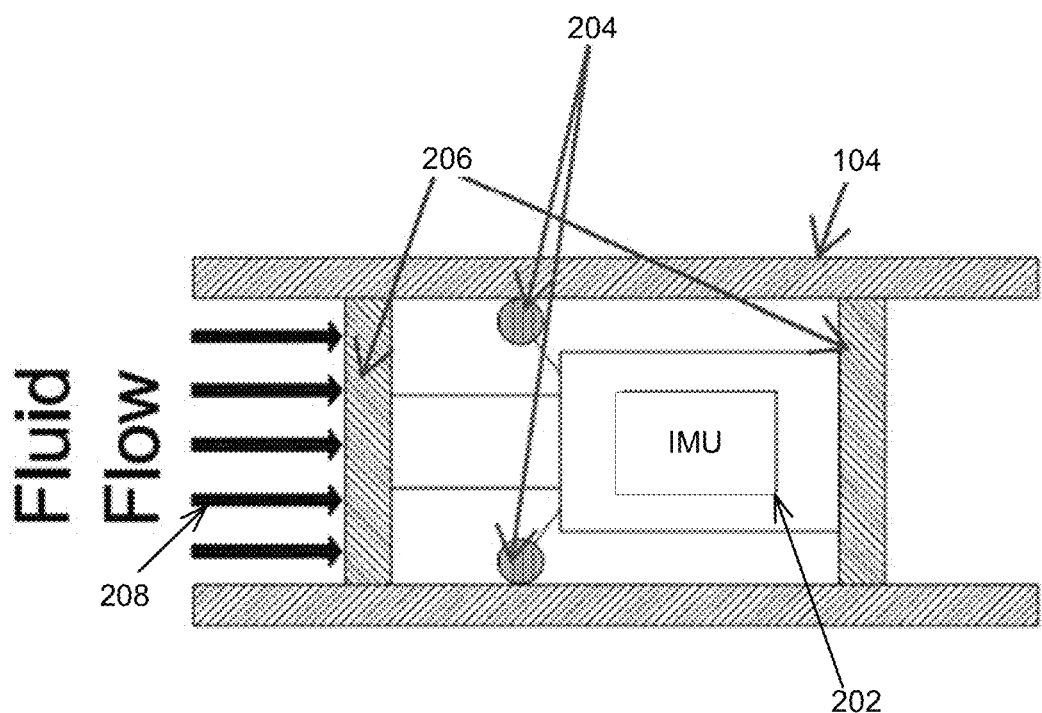

FIG. 2 is a schematic diagram illustrating one embodiment of a PIG tool.

Figure 3:
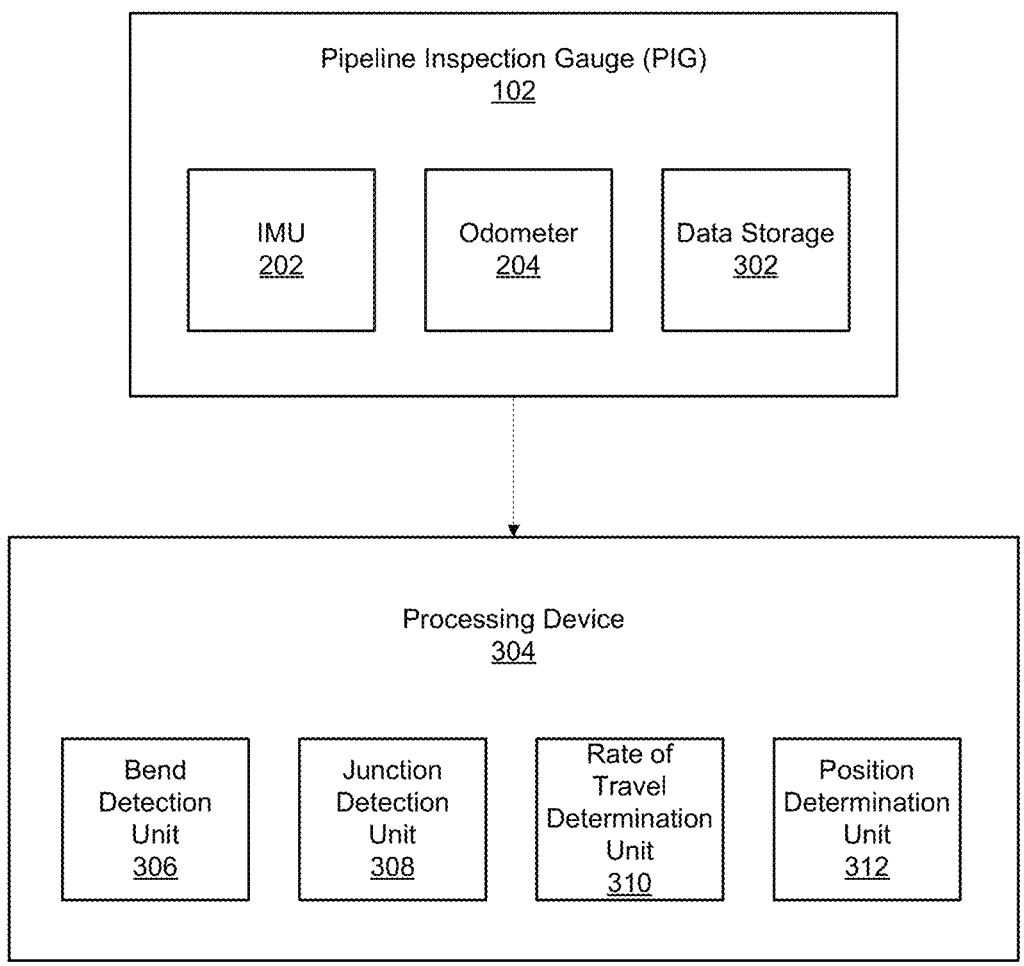

FIG. 3 is a schematic block diagram illustrating one embodiment of a PIG tool.

Figure 4:
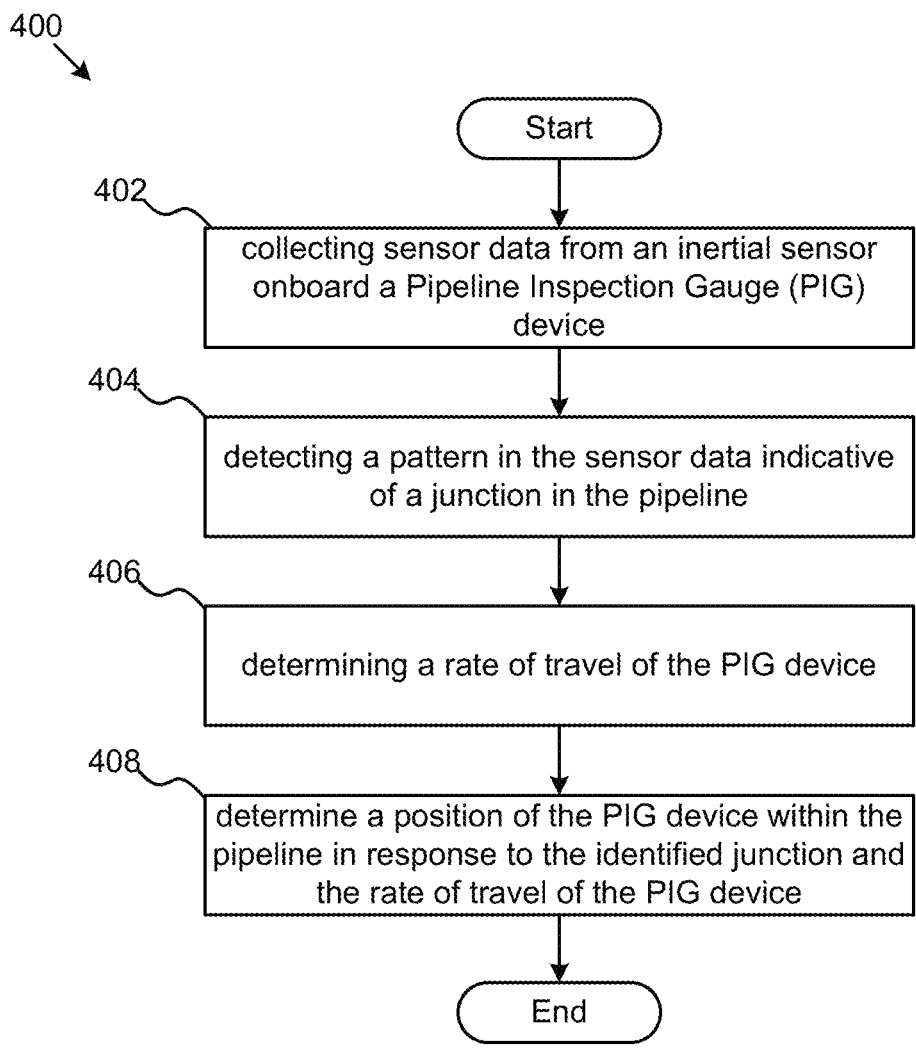

FIG. 4 is a flowchart diagram illustrating one embodiment of a method for enhance pipeline trajectory reconstruction for pipelines Integrity Monitoring using pipeline junctions.

FIG. 5A illustrates an embodiment of detected pipeline junction.

FIG. 5B illustrates an embodiment of detected pipeline junction.

Figure 5:
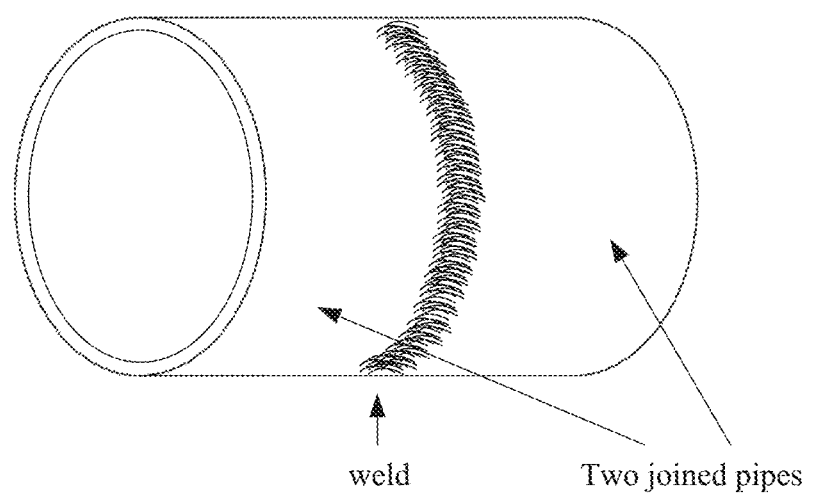

FIG. 5 illustrates an embodiment of a detected pipeline junction.

Figure 6:
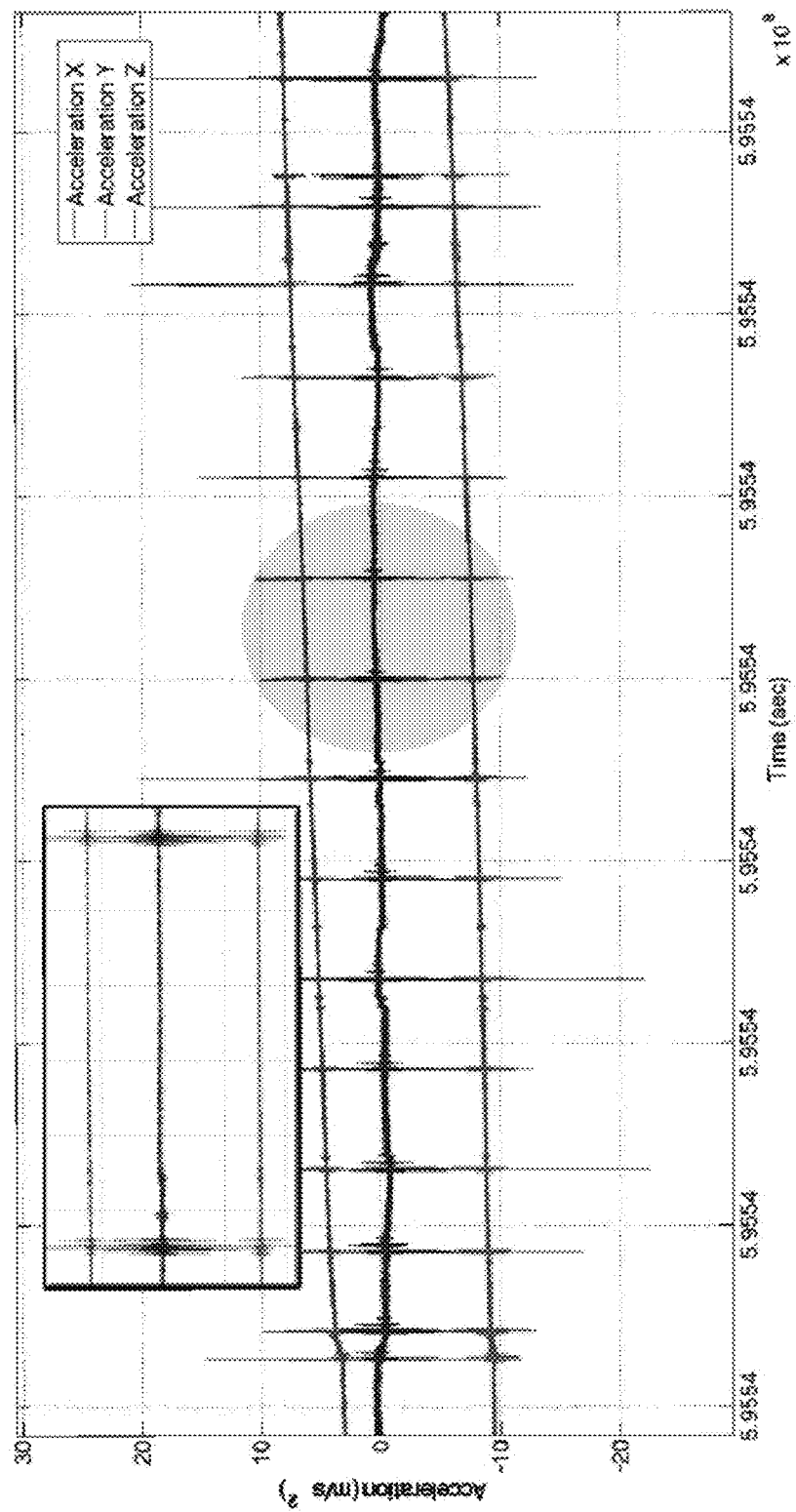

FIG. 6 illustrates an embodiment of an accelerometer output.

Figure 7:
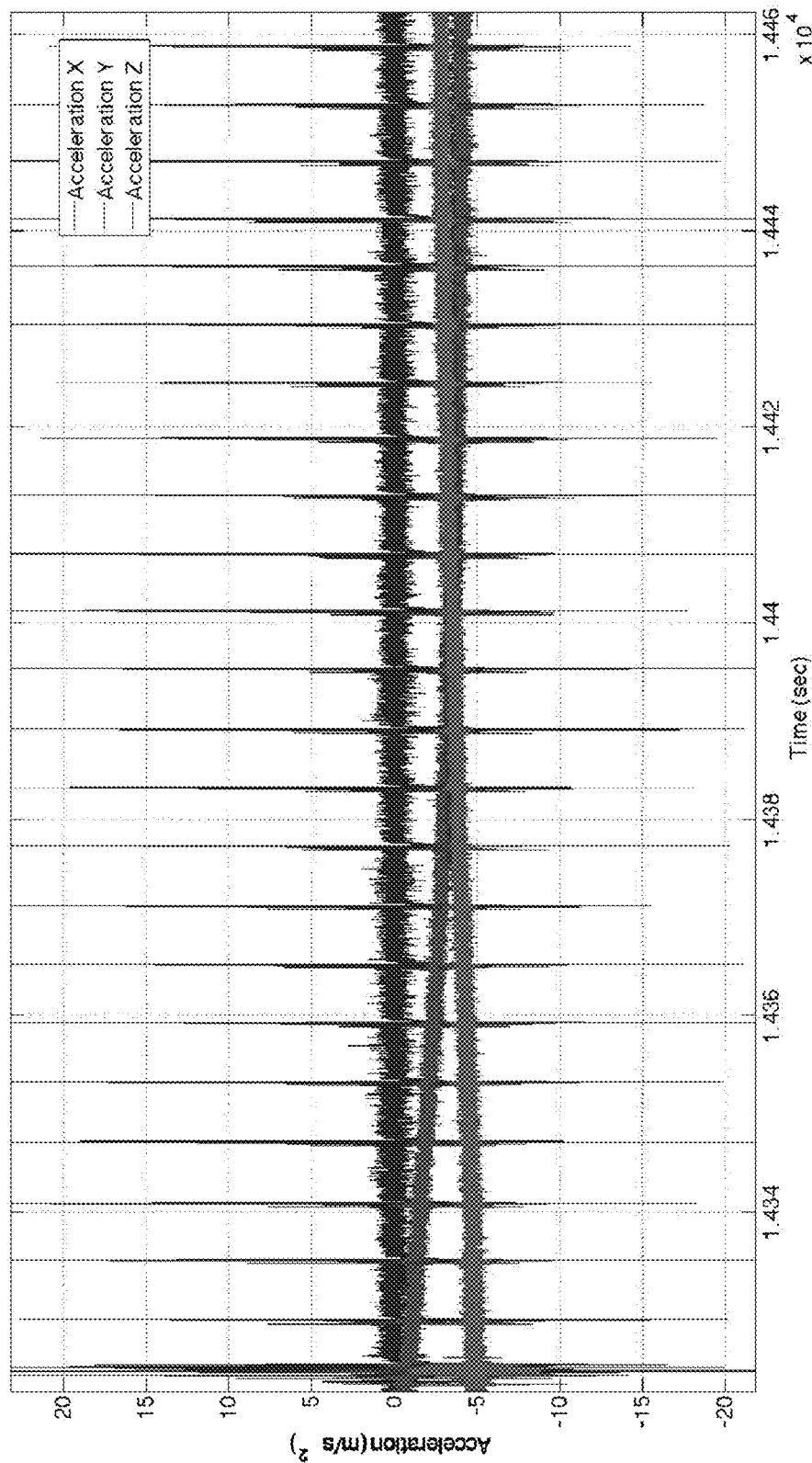

FIG. 7 illustrates another embodiment of an accelerometer output.

Figure 8:
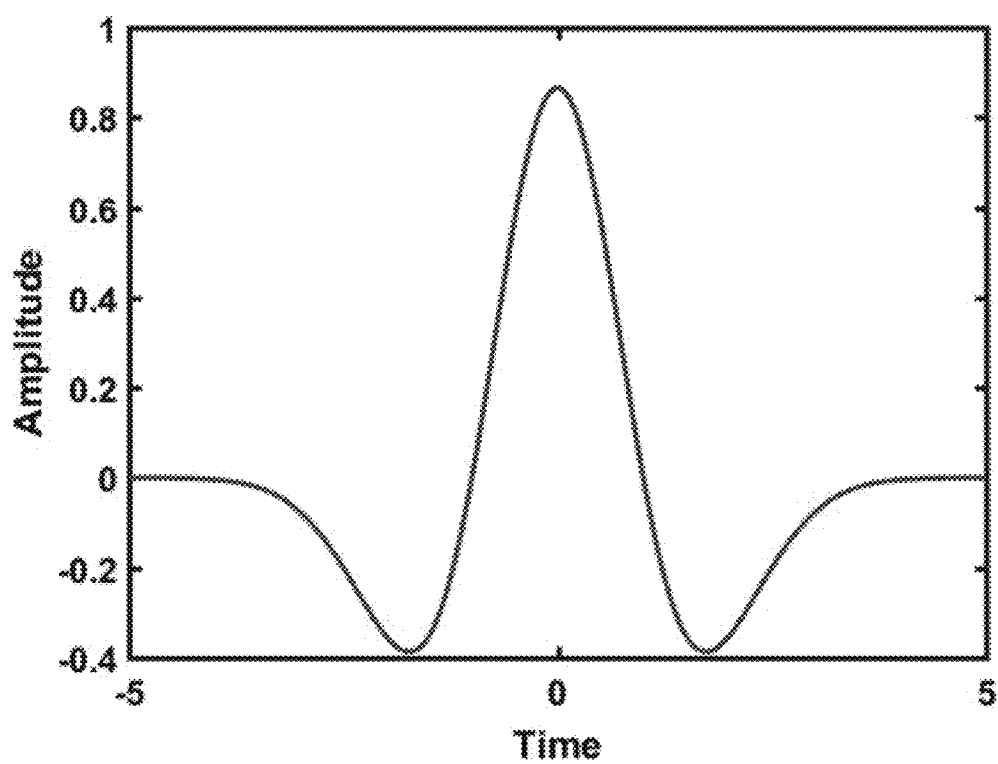

FIG. 8 illustrates an embodiment of a Mexican Hat mother wavelet.

Figure 9:
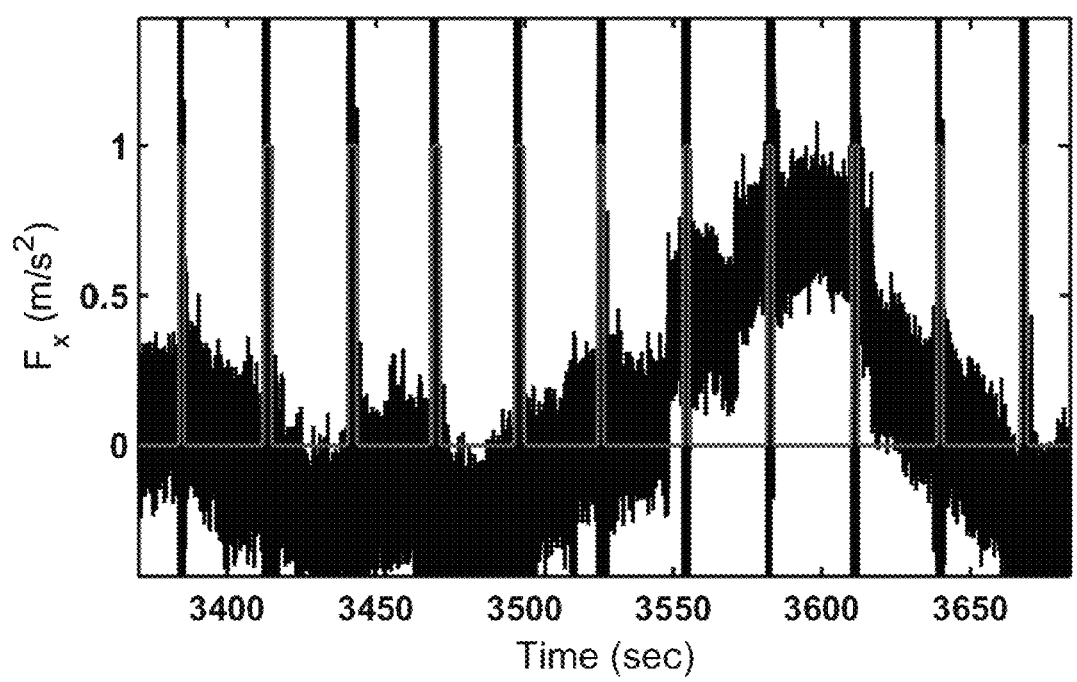

FIG. 9 illustrates an embodiment of a detected pattern using WL.

Figure 10:
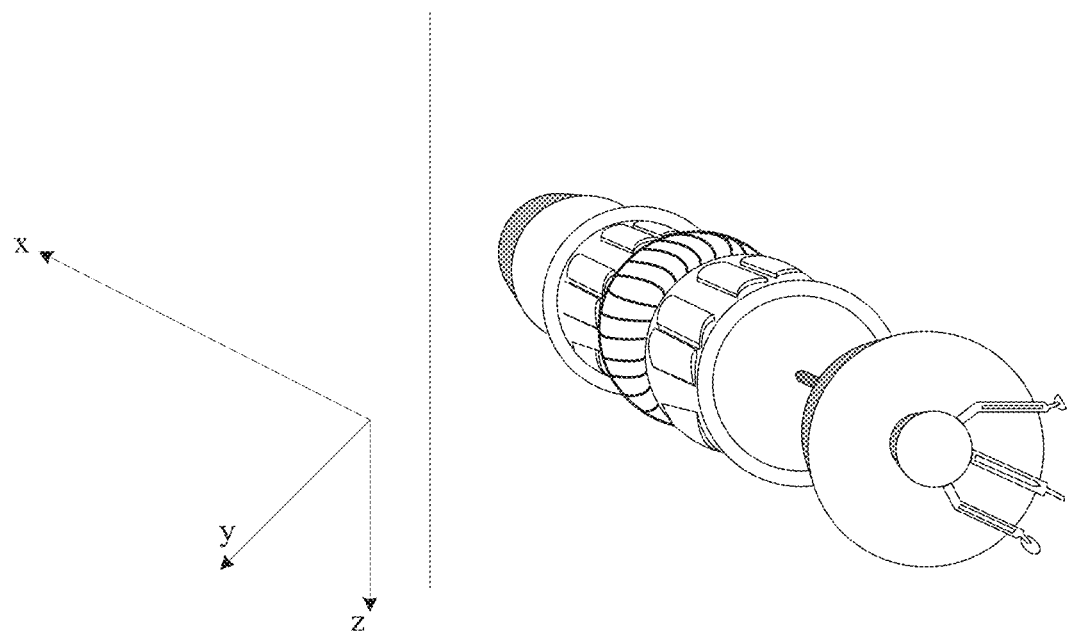

FIG. 10 illustrates an embodiment of PIG defined axes.

Figure 11:
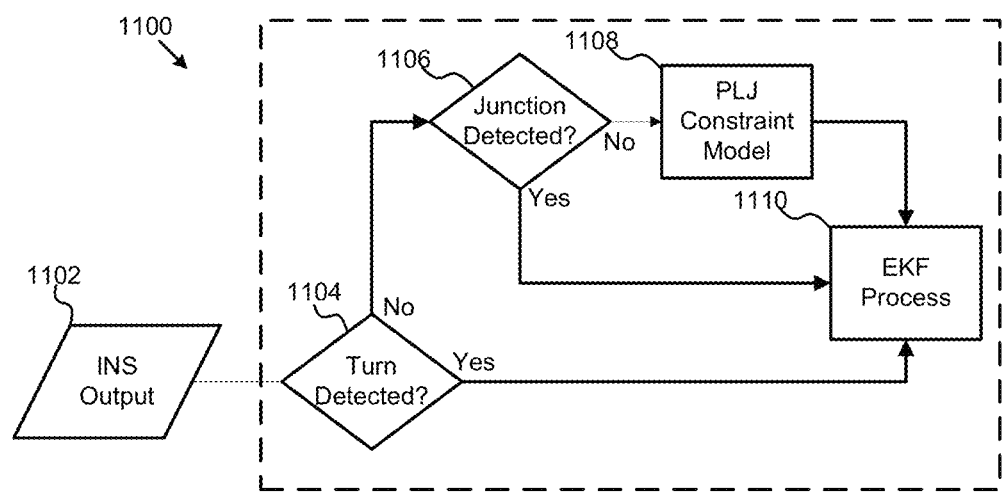

FIG. 11 illustrates one embodiment of a method for corrected state estimation.

Figure 12:
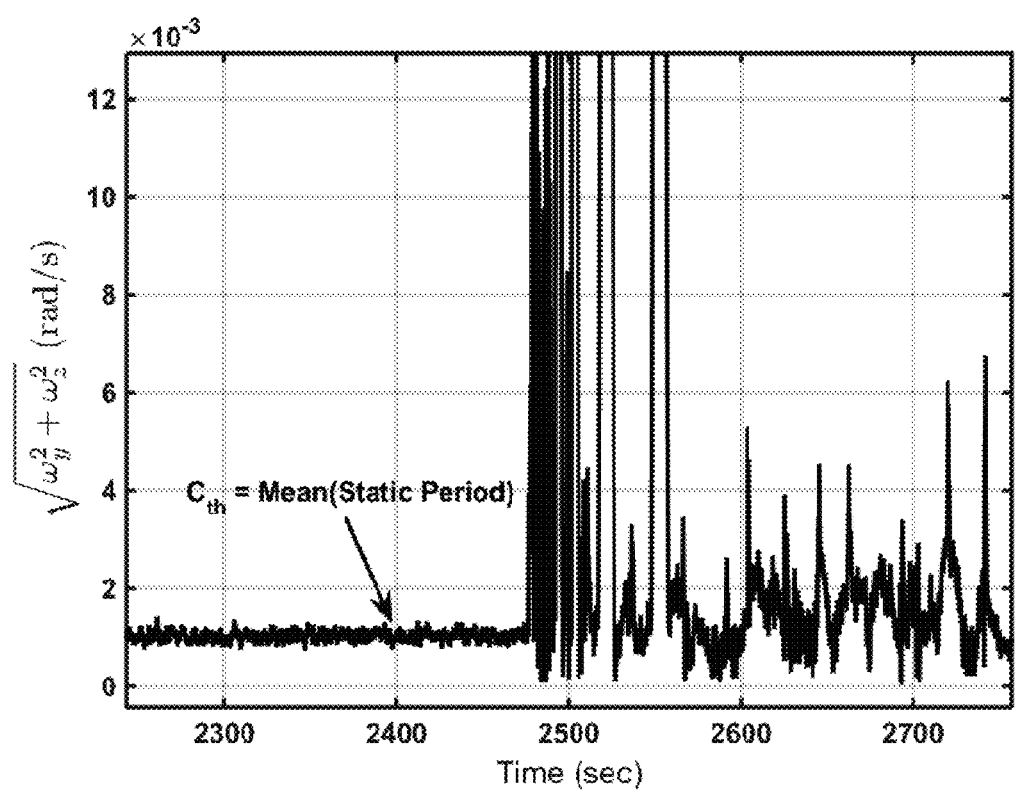

FIG. 12 illustrates an embodiment of selecting threshold criteria.

Figure 13:
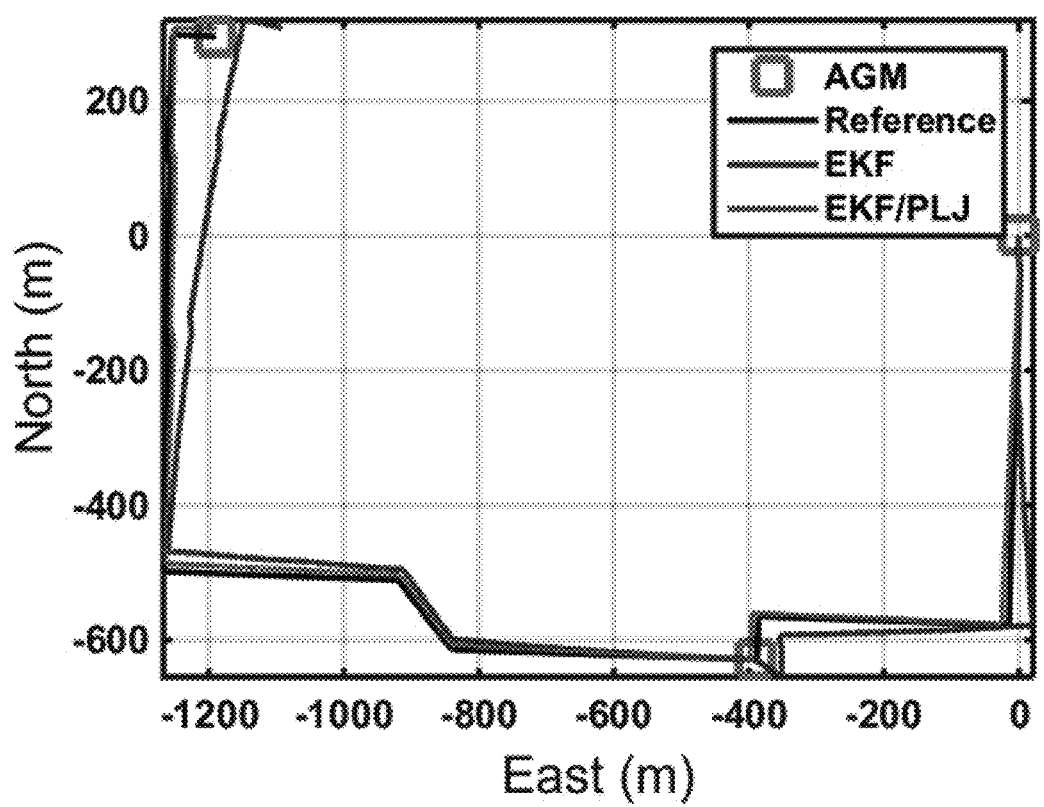

FIG. 13 illustrates estimated trajectories for Scenario #1.

Figure 14A:
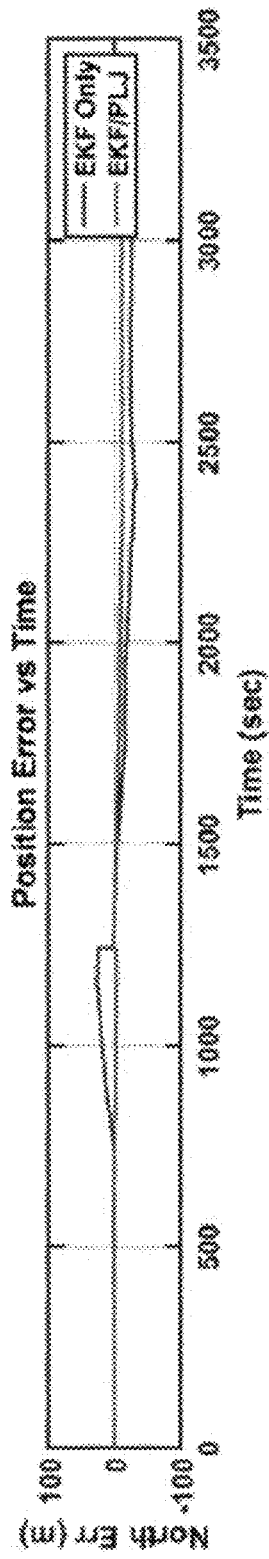

FIG. 14A illustrates positions errors with EKF and EFK/PLJ for Scenario #1.

Figure 14B:
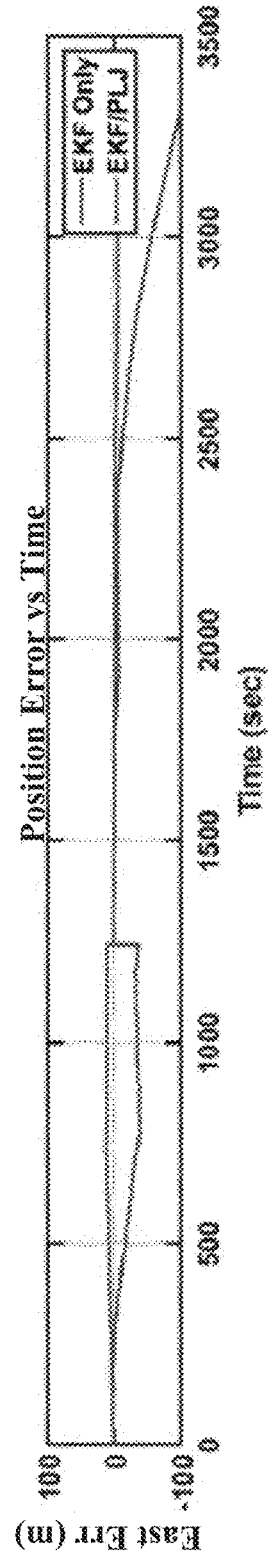

FIG. 14B illustrates positions errors with EKF and EFK/PLJ for Scenario #1.

Figure 14C:
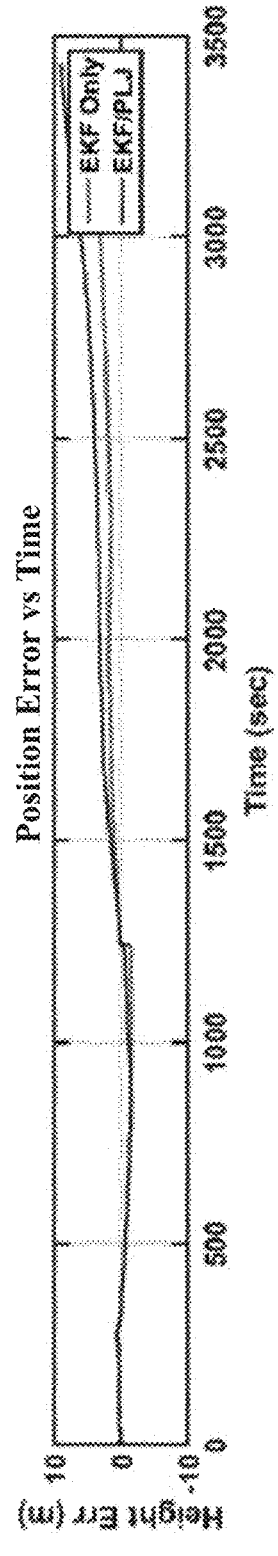

FIG. 14C illustrates positions errors with EKF and EFK/PLJ for Scenario #1.

Figure 15:
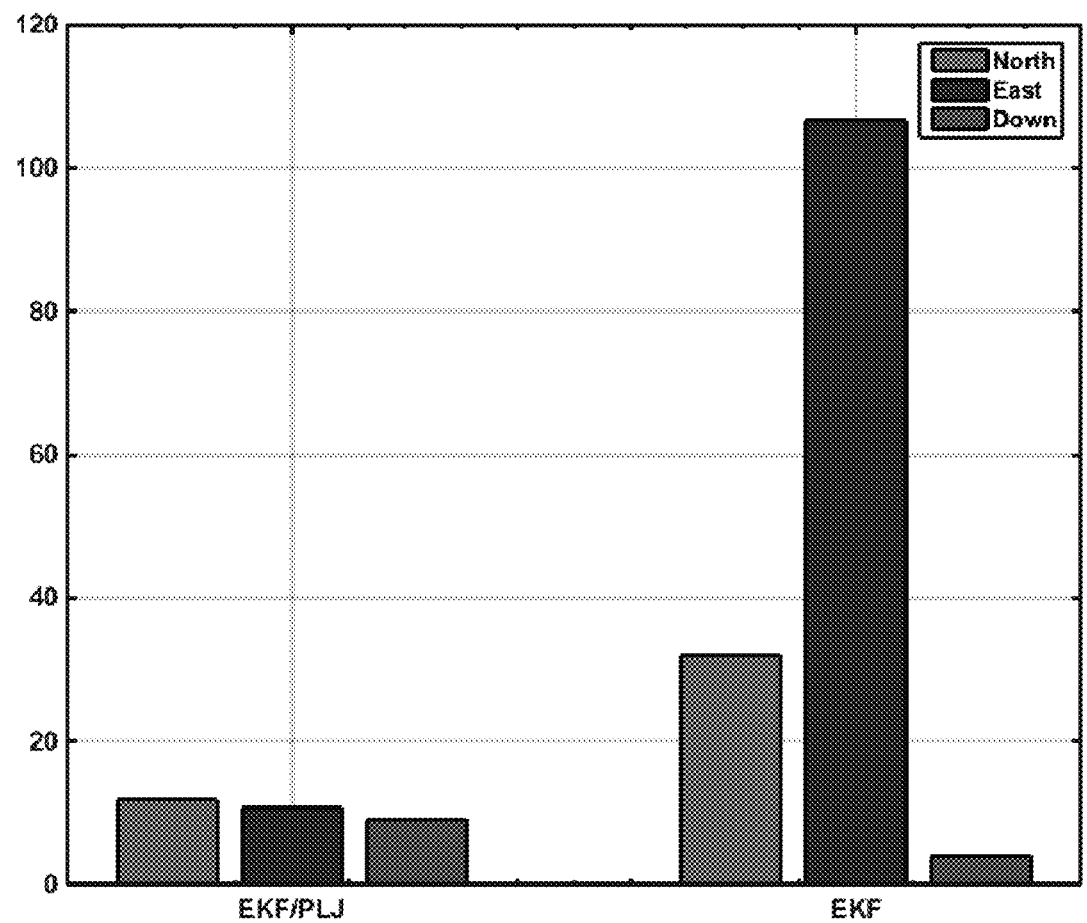

FIG. 15 illustrates maximum position error for scenario #1.

Figure 16:
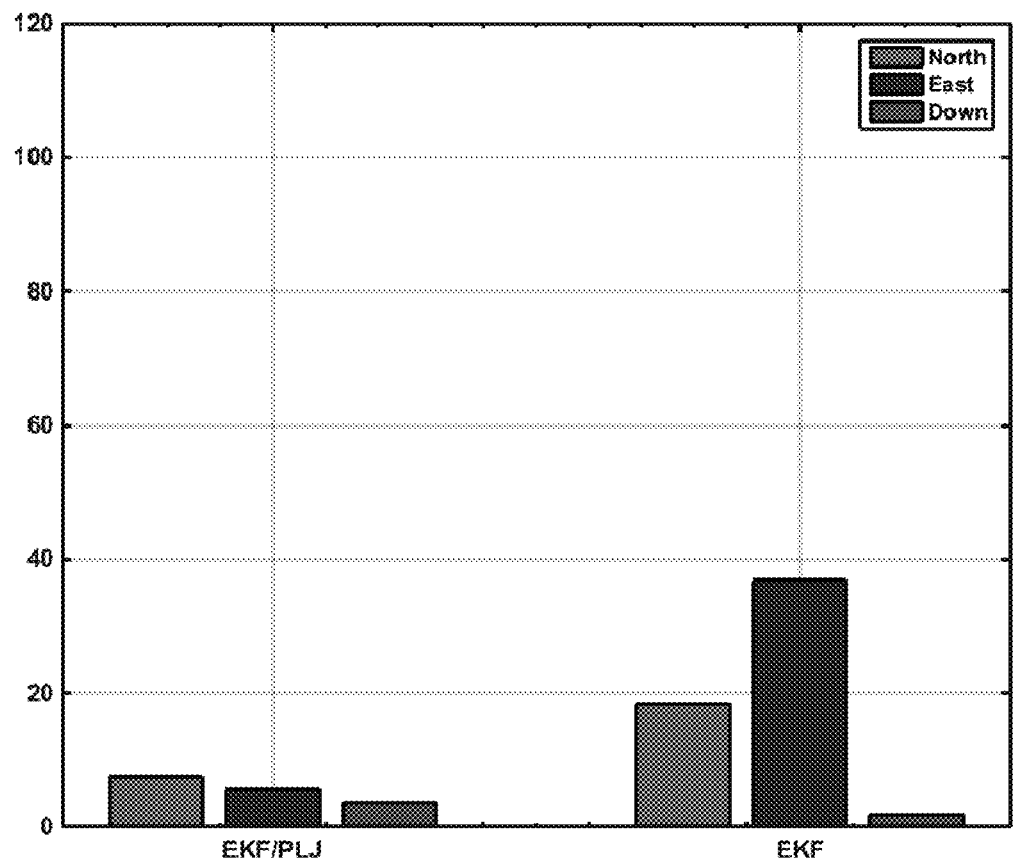

FIG. 16 illustrates RMS position errors for scenario #1.

Figure 17:
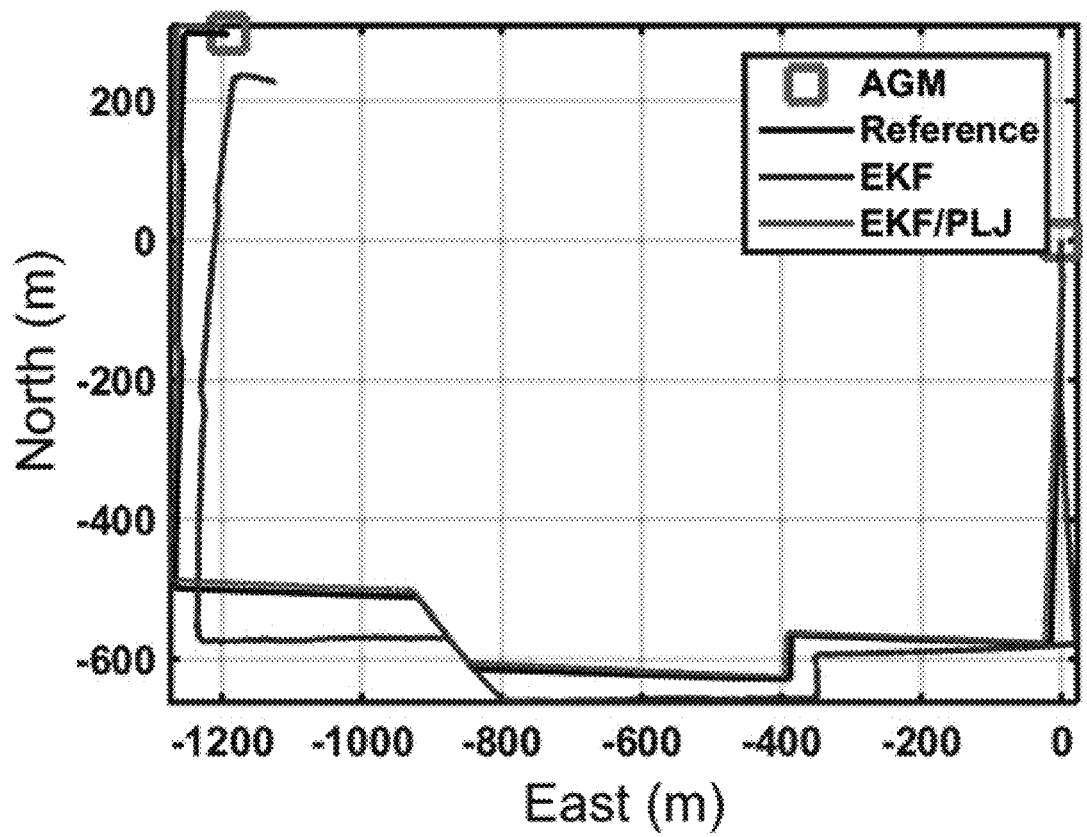

FIG. 17 illustrates trajectories for Scenario #2.

Figure 18A:
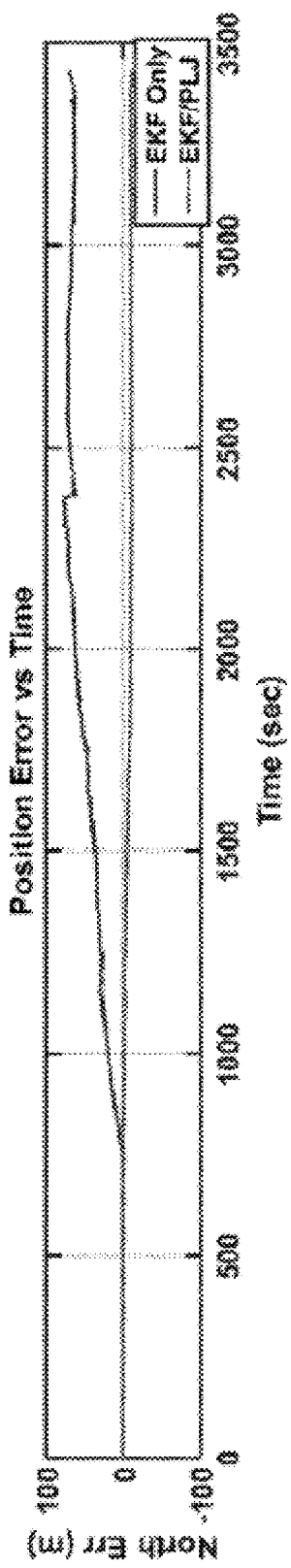

FIG. 18A illustrates positions RMS errors with EKF for Scenario #2.

Figure 18B:
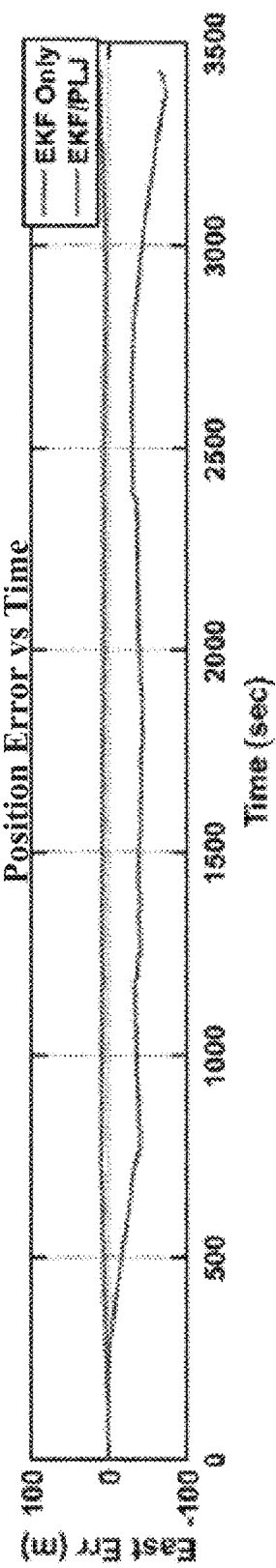

FIG. 18B illustrates positions RMS errors with EKF for Scenario #2.

Figure 18C:
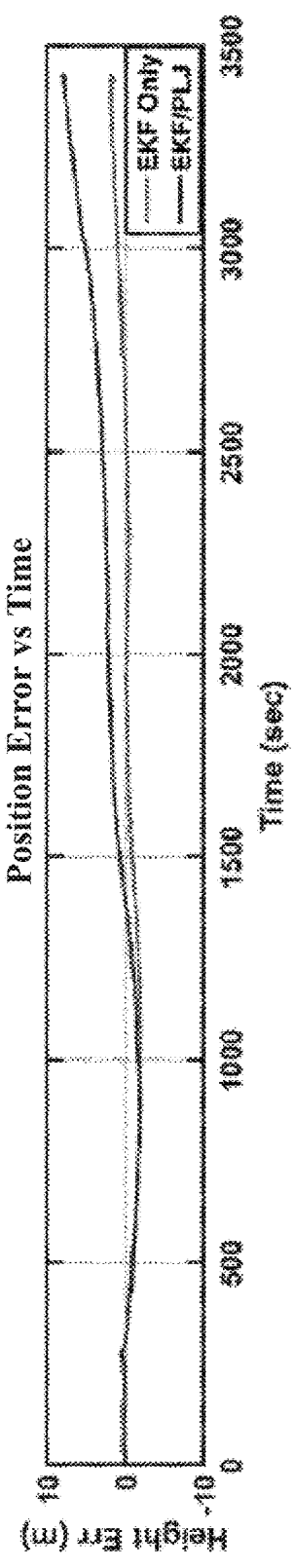

FIG. 18C illustrates positions RMS errors with EKF for Scenario #2.

Figure 19:
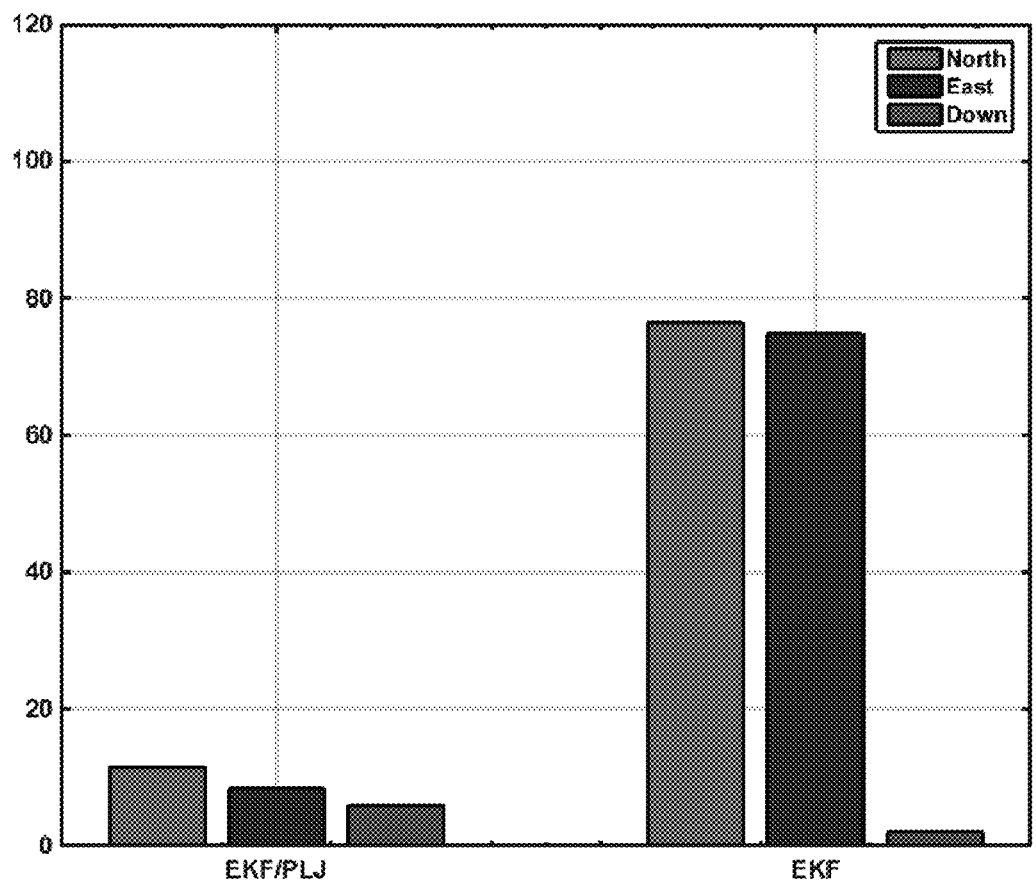

FIG. 19 illustrates maximum position errors for Scenario #2.

Figure 20:
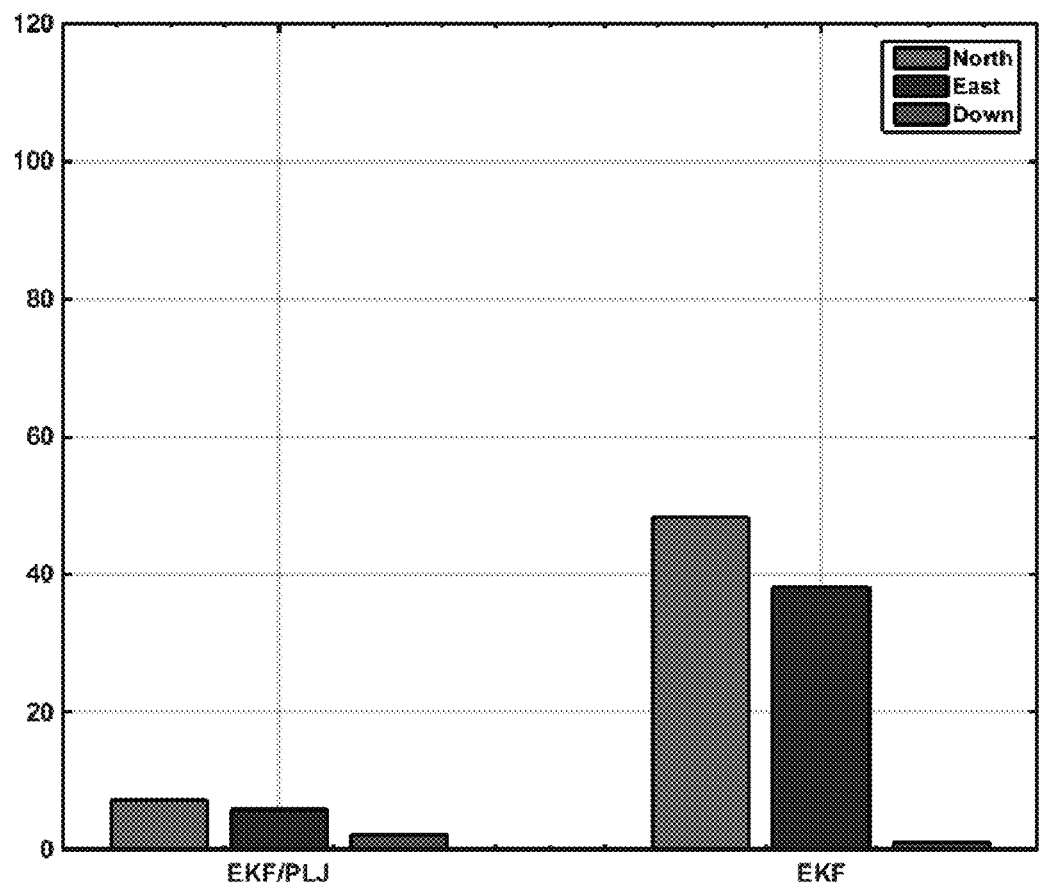

FIG. 20 illustrates RMS positions errors for Scenario #2.

Figure 21:
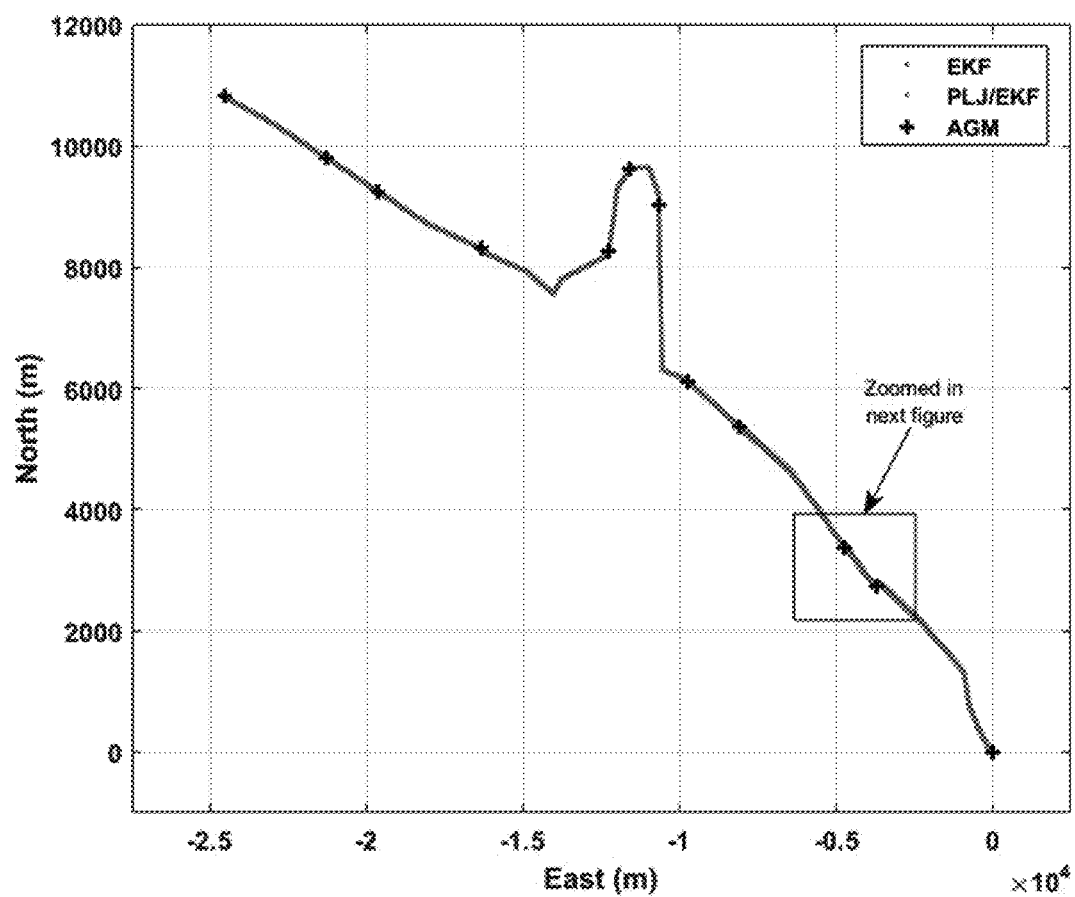

FIG. 21 illustrates full trajectory for an embodiment of an accelerometer.

Figure 22:
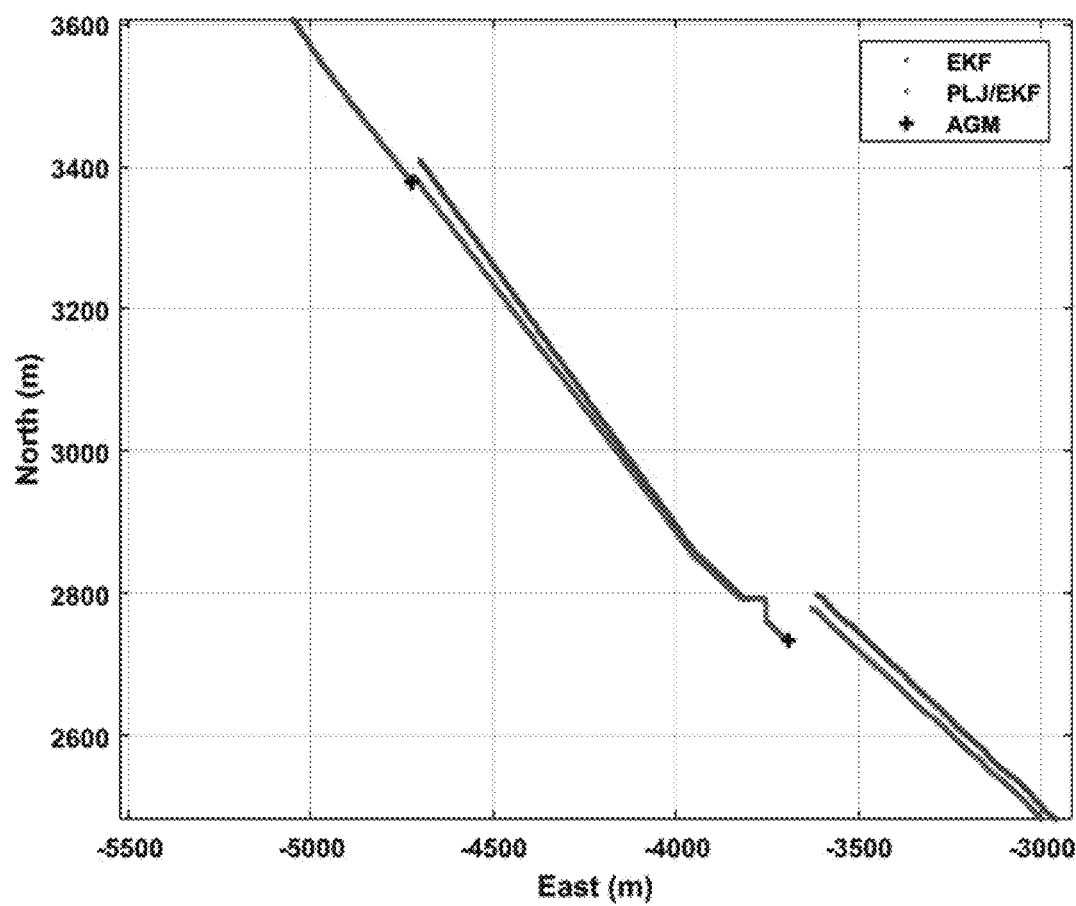

FIG. 22 is a zoomed view illustrating a portion of trajectory data from FIG. 21.

Figure 23:
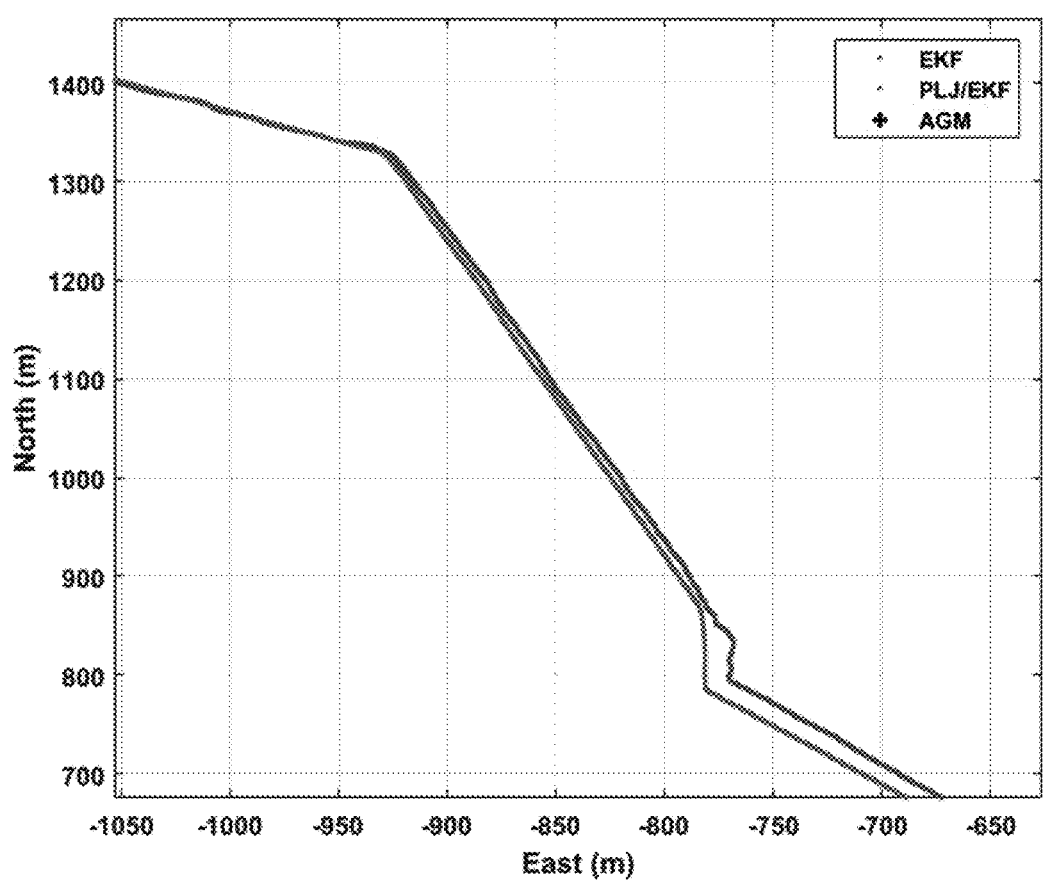

FIG. 23 illustrates the effect of EKF/PLJ algorithm.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

"Pigging" is a pipeline industrial term that refers to the practice of using a PIG 102 to perform various maintenance operations on a pipeline 104 as shown in FIG. 1. In an embodiment, the PIG 102 carries embedded computers and sensors to acquire pipeline information while moving in the PIG 104. Because the PIG 102 uses the flow 208 of fluids, such as oil, to move through the pipeline 104, a pigging procedure requires the flow 208 not to be stopped in the PIG 104. In general, the total journey length of pipeline 104 can vary between hundreds of meters to hundreds of kilometers.

Due to the distance underwater or underground, and/or the material that the pipeline 104 is made of, it is not possible for the PIG 102 to communicate directly with the outside world. The collected data is saved internally and processed later (post-processed). The process requires that extra navigation sensors be used to improve the performance of the pig's location estimation methods. A wheel odometer 204, for example, can measure traveled distances (by counting the number of wheel revolutions) that are translated later into velocity measurements. These measurements can be used as external updates for the navigation algorithms. FIG. 2 illustrates embodiments of the navigation sensors of a typical pig tool. Supports 206 are mainly the front and end parts that provide the sealing for the instruments, such IMU 202. These supports have nominal diameters larger than the pipe diameter to produce efficient sealing, in some embodiments. The PIG body may be contained between the two supports 216.

Above Ground Marker (AGM) is another device that can be installed on the surface of the ground above the PIG 104. This device detects and records the passage of the PIG 102 in the PIG 104 when PIG 102 moves underneath. AGM provides the navigation coordinates of its position (latitude, longitude, and height) along with PIG's passage time. This information is used as a current position update (CUPT) in the estimation algorithm. However, due to the cost of these of devices and their installation costs, it is desirable to minimizing their usage. Usually, these AGMs are installed every 1-3 km for high-end tactical grade IMUs.

Advances in Micro-Electro-Mechanical-Systems (MEMS) technology combined with the miniaturization of electronics, have made it possible to produce low cost and lightweight chip-based inertial sensors. These chips are small in size and lightweight; however, the current achieved performance by these low cost sensors is relatively poor due to unbounded cumulative sensor errors.

The present embodiments describe methods for low-cost inertial measurement units (IMU) 202 using an extended Kalman filter (EKF) to increase accuracy the PIG 102 derived navigation information or reduce the total RMS errors even during the unavailability of Above Ground Markers (AGM). The results of such embodiments with a micro-electro-mechanical systems (MEMS) based IMU show that the position RMS errors may be reduced by around 85% of the original applied EKF solution. Therefore, this approach is a useful solution for PIG navigation system.

The described embodiments improve the accuracy of the final reconstructed trajectories solution by adding sources of information and imposing an alternative set of constraints to estimation techniques.

Generally, for a PIG 102 to be able to assess its position coordinates, it must carry instruments, such as inertial sensors (accelerometers and gyroscopes) along with other sensors. To minimize cumulative error growing of the MEMS-IMU, a sensor fusion technique is used. In this technique, a combination of inertial sensors with non-inertial sensors is implemented. An odometer and AGM may be employed as non-inertial sensors and used to update the algorithm, in some embodiments. In an embodiment, the PIG 102 may be pushed through the pipeline 104 by fluid flow 208 pressing against one or more supports 206.

Various estimation techniques can be used in such applications, but Extended Kalman Filter (EKF) is commonly used for sensor fusion integration in navigation applications, especially for nonlinear dynamic models. Therefore, EKF may be suitable for use with the present embodiments.

The present embodiments make use of IMU signals that have been collected from different PIGs 102 for different pipelines trajectories to determine a repetitive signal/pattern that is detected in all accelerometers signals. A sample of this detected signal (for forward axis) is shown in FIG. 9. Taking in the consideration the speed of the PIG 102, it has been noticed that the distance between these repetitive signals equal to the length of PIG 104 or fitting pieces. This means that this pattern represent the pipeline junction (PLJ). This information may be used as constraints to the estimation methods described herein.

FIG. 3 illustrates a block diagram of one embodiment of a system to enhance pipeline trajectory reconstruction using pipeline junctions. In an embodiment, the system include a PIG 202 and a processing device 304. In the described embodiment, the processing device 304 may be external to the PIG 202. In an alternative embodiment, the processing device 304 may be integrated with the PIG 202. The PIG 202 may include a MEMS IMU 202, and an odometer 204 as described in relation to FIG. 2. Additionally, the PIG 102 may include a data storage device 302, in one embodiment. In such an embodiment, the data storage device 302 may store data collected from the MEMS IMU 202 and the odometer 204, and store it for later processing.

In an embodiment, the processing device 304 may include a bend detection unit 306, a junction detection unit 308, a rate of travel determination unit 310, and a position determination unit 312, as described in various embodiments herein. In an embodiment, the bend detection unit 306 may use the data collected form the MEMS IMU 202 to identify a bend in the pipeline 104. The junction detection unit 308 may use the data collected from the MEMS IMU 204 to detect one of various types of junctions as described below with reference to FIG. 5. Additionally, the rate of travel determination unit 310 may use the data collected form the odometer to determine a rate of travel of the PIG 102 while in the pipeline. In an embodiment, the position determination unit 312 may use the data collected by the MEMS IMU 202 and the odometer 204 to determine a location of certain features, including bends detected by the bend detection unit 306, and junctions determined by the junction detection unit 308. In an further embodiment, the position determination unit 312 may use information about identified junctions or bends to determine the location of the PIG 102 at a given point in time.

FIG. 4 illustrates an embodiment of a method 400 to enhance pipeline trajectory reconstruction using pipeline junctions. In an embodiment, the method 400 includes collecting sensor data from an internal sensor onboard a PIG device 102, as shown at block 402. The method 400 may also include detecting, as shown at block 404, a pattern in the sensor data indicative of a junction in the pipeline. The method 400 may also include determining a rate of travel of the PIG device 102, as shown at block 406. At block 408, the method 400 may include determining a position of the PIG device 102 within the pipeline 104 in response to the identified junction and the rate of travel of the PIG 102.

Pipelines 104 typically include multiple pieces of pipeline and fittings (bends, T-connections, valves . . . etc.). The pipeline pieces may be fabricated in straight-line shapes. Different methods can be used to connect these pipeline pieces with each other, such as push on junctions, flanges, and welding techniques, as shown in FIG. 5. In all cases, a small gap tolerance will appear between two pieces.

The connection points between two pipelines 104 is called the pipeline junction/joint. These junctions can be detected using magnetic flux leakage (MFL) and electromagnetic acoustic transducers for pipeline analysis purposes. However, due to sudden vibrations of the pig while passing through pipeline junctions, INS sensors 202 are sensitive enough to capture these junctions. Sample accelerometer pipeline data outputs for a MEMS-based IMU (SiIMU02) and a high-end tactical grade IMU (LN200) are illustrated in FIG. 6 and FIG. 7, respectively. As seen, repetitive pattern spikes appear. Studying different IMUs signals collected from different pigs for different pipelines trajectories shows a repetitive signal/pattern in all the accelerometers' signals. Taking into consideration the speed of the pig, the distance between two spikes is equal to the length of the fitting or the pipeline pieces. Therefore, the pattern represents the pipeline junction (PLJ). Such information is used as a new constraint to the estimation techniques (as explained in Section 0).

To detect the spikes in the signal, different methods have been used in the signal processing literature. In this paper, a discrete wavelet transformation (DWT) has been used to detect these spikes due to its simple implementation. The definition of wavelet transform can be written as:

$$X_w(a, b) = \frac{1}{\sqrt{b}} \int x(t) M\left(\frac{t-a}{b}\right) dt \quad (1)$$

Here x(.) is the input, and M(.) is the mother wavelet. The parameters (a) is real number that represent a time location. (b) is a positive real number that represents the scaling. Many types of mother wavelets can be used in signal pattern detection applications, such as the Haar basis and Mexican Hat. FIG. 8 illustrates the Mexican Hat mother wavelet that has the following model:

$$M(t) = \frac{2^{\frac{5}{4}}}{\sqrt{3}} (1 - 2\pi t^2) e^{-\pi t^2} \quad (2)$$

The Mexican Hat mother wavelet has been applied to detect the signal patterns (pipeline junctions) as shown in FIG. 9.

Because these patterns represent the pipeline junctions, a constraint is introduced here and called Pipeline Junction Constraint (PJC). This constraint fixes both the heading and pitch angles during the movement inside the pipeline piece, but not during the junctions, in some embodiments. An embodiment of a measurement model for PJC is described herein. In such embodiments, the roll angle is free to rotate along the pipeline axis. Therefore, roll angle will not be included in PJC measurement model.

The above calculations assume that the period between two junctions represents a straight pipe. However, due to the fittings (i.e., bends), this assumption cannot be considered true all the time. Therefore, the PJC model will be supported by a bend detection algorithm (BDA) to detect the bends and disable the PJC model during the bend periods Bend Detection Algorithm (BDA)

A PIG 102 may include multiple gyroscopes that measure and record the angular rates of its motion around three axes x, y, and z. In an embodiment, the PIG axes are defined as shown in FIG. 10. In FIG. 10, $\omega_x$ measures the rate change of roll angle, while $\omega_y$ and $\omega_z$ measure the rate change of pitch and heading angles.

In order to detect whether the PIG 102 is moving within a bend, the resultant angular rate in yz plane may be calculated, as follow:

$$\omega_R = \sqrt{\omega_y^2 + \omega_z^2} \quad (3)$$

Here $\omega_R$ is a resultant angular rate. FIG. 11 illustrates a method for corrected state estimation. In some embodiments, selecting the threshold is an important part in this method 1100. By plotting different resultant angular rates for different IMUs, the best value to select ($C_{th}$) may be the mean value of the static period (during the calibration time). Checking the condition of this threshold may be done at every iteration and before applying the PJC constraints as shown in FIG. 11.

In an embodiment, the PLJ method 1100 includes receiving an INS output at block 1102. At block 1104, a turn determination is made. If a turn is detected, then the EKF process is carried out at block 1110. If not, then a junction determination is made at block 1106. If a junction is identified, then the EKF process is carried out at block 1110. If not, then a PLJ constraint model is generated at block 1108 and then the EKF process is performed at block 1110.

FIG. 12 illustrates the $\omega_R$ values that have been calculated before compensating for gyro biases and scale factors. Threshold ($C_{th}$) can be selected as the mean value of all resultant angular rates of $\omega_y$ and $\omega_z$ during the static period of the PIG 102 before the PIG 102 starts moving.

To account for all three-dimensional dynamics of the PIG motion, a total of six sensors may be used in a full IMU, which may include three gyroscopes and three accelerometers. In addition to the IMU, an odometer may be used to measure the displaced traveled distance of the PIG 102. Moreover, AGMs may be considered; however, the it is preferable to use the fewest possible number of AGMs.

Dynamic Error Model

MEMS-IMU is an embodiment of a sensor that may be used to collect the PIG's motion data. EKF may be used as an estimation technique to overcome the poor performance and non-linearity of the dynamic system in some embodiments. Both dynamic and measurement models have been developed to accurately estimate the states of the system. The state vector to be estimated is design to include the errors associated with the position, velocity, and attitude. Moreover, the stochastic bias errors associated with the gyroscopes and accelerometers are also described. Therefore, the state vector will be defined as follows:

$$\delta x = [\delta r \, \delta v \, \delta \varepsilon \, \delta b_g \, \delta b_a \, \delta S_g \, \delta S_a]^T \qquad (4)$$

Where
$\delta r$: Position error (3×1)
$\delta v$: Velocity error (3×1)
$\delta \varepsilon$: Attitude error (3×1)
$\delta b_g$: Gyroscope bias error (3×1)
$\delta b_a$: Accelerometer bias error (3×1)
$\delta S_g$: Gyroscope Scale Factor error (3×1)
$\delta S_a$: Accelerometer Scale Factor error (3×1)

The dynamic model is non-linear. It can be represented in discrete form as follows:

$$x_{k+1} = f(x_k, k) + g(x_k, k) w_k \qquad (5)$$

Where f is the dynamic model, g is the stochastic model, and w is the process noise.

The linearized error state system model can be expressed as:

$$\delta x_{k+1} = \Phi_k \delta x_k + G_k w_k \qquad (6)$$

Where
$\delta x_{k+1}$: is the (21×1) state vector
$\phi_k$: is the (21×21) transition matrix
$G_k$: is the (21×1) noise distribution matrix
$w_k$: is the unit-variance white Gaussian noise By applying Taylor series expansion and ignoring the higher order terms, the linearized system model in the local level frame (LLF) represented as NED can be expressed as follows:

$$\delta x_{k+1} = \begin{bmatrix} I & F_1 & 0 & 0 & 0 & 0 & 0 \\ 0 & I & F_2 & 0 & F_3 & 0 & 0 \\ 0 & F_4 & I & F_3 & 0 & 0 & 0 \\ 0 & 0 & 0 & F_5 & 0 & 0 & 0 \\ 0 & 0 & 0 & 0 & F_6 & 0 & 0 \\ 0 & 0 & 0 & 0 & 0 & F_7 & 0 \\ 0 & 0 & 0 & 0 & 0 & 0 & F_8 \end{bmatrix} \begin{bmatrix} \delta r_k \\ \delta v_k \\ \delta \varepsilon \\ \delta b_g \\ \delta b_a \\ \delta S_g \\ \delta S_a \end{bmatrix} + \begin{bmatrix} \sigma_r \\ \sigma_v \\ \sigma_\varepsilon \\ F_9 \\ F_{10} \\ F_{11} \\ F_{12} \end{bmatrix} w_k w_k \qquad (7)$$

Where $$\delta r_k = [\delta \varphi_k, \delta \lambda_k, \delta h_k]^T, \qquad (1)$$
$$\delta v_k = [\delta v_k^N, \delta v_k^E, \delta v_k^D]^T$$
$$\delta \varepsilon_k = [\delta r_k, \delta p_k, \delta A_k]^T,$$
$$\delta b_g = [\delta b_{gx}, \delta b_{gy}, \delta b_{gz}]^T$$
$$\delta b_a = [\delta b_{ax}, \delta b_{ay}, \delta b_{az}]^T$$

$$F_1 = \begin{bmatrix} \frac{1}{R_M + h} & 0 & 0 \\ 0 & \frac{1}{(R_N + h)\cos\varphi} & 0 \\ 0 & 0 & -1 \end{bmatrix} \cdot \Delta t \qquad (2)$$

$$F_2 = \begin{bmatrix} 0 & f_u & -f_n \\ -f_u & 0 & f_e \\ f_n & -f_e & 0 \end{bmatrix} \cdot \Delta t \qquad (3)$$

$$F_3 = \begin{bmatrix} R_{11} & R_{12} & R_{13} \\ R_{21} & R_{22} & R_{23} \\ R_{31} & R_{32} & R_{33} \end{bmatrix} \cdot \Delta t \qquad (4)$$

$$F_3 = \begin{bmatrix} R_{11} & R_{12} & R_{13} \\ R_{21} & R_{22} & R_{23} \\ R_{31} & R_{32} & R_{33} \end{bmatrix} \cdot \Delta t \qquad (5)$$

$$F_4 = \begin{bmatrix} \frac{1}{R_M + h} & 0 & 0 \\ 0 & \frac{-1}{R_N + h} & 0 \\ 0 & \frac{-\tan\varphi}{R_N + h} & 0 \end{bmatrix} \cdot \Delta t \qquad (6)$$

$$F_5 = \begin{bmatrix} -\beta_{\omega x} & 0 & 0 \\ 0 & -\beta_{\omega y} & 0 \\ 0 & 0 & -\beta_{\omega z} \end{bmatrix} \cdot \Delta t \qquad (7)$$

$$F_6 = \begin{bmatrix} -\beta_{fx} & 0 & 0 \\ 0 & -\beta_{fy} & 0 \\ 0 & 0 & -\beta_{fz} \end{bmatrix} \cdot \Delta t \qquad (8)$$

$$\sigma_r = \begin{bmatrix} \sigma_\varphi \\ \sigma_\lambda \\ \sigma_h \end{bmatrix}, \qquad (9)$$

$$\sigma_v = \begin{bmatrix} \sigma_{v^n} \\ \sigma_{v^e} \\ \sigma_{v^d} \end{bmatrix},$$

$$\sigma_\varepsilon = \begin{bmatrix} \sigma_r \\ \sigma_p \\ \sigma_A \end{bmatrix}$$

$$F_7 = \begin{bmatrix} \sqrt{2\beta_{\omega x} \sigma_{\omega x}^2} \\ \sqrt{2\beta_{\omega y} \sigma_{\omega y}^2} \\ \sqrt{2\beta_{\omega z} \sigma_{\omega z}^2} \end{bmatrix}, \qquad (10)$$

$$F_8 = \begin{bmatrix} \sqrt{2\beta_{fx} \sigma_{fx}^2} \\ \sqrt{2\beta_{fy} \sigma_{fy}^2} \\ \sqrt{2\beta_{fz} \sigma_{fz}^2} \end{bmatrix}$$

Where
$\beta, \alpha$: Reciprocal of the correlation time of the process related to biases and accelerations stochastic models, respectively
$\sigma^2$: Variance of the white noise associated with the random process
$R_M$: Meridian radius of curvature(North-South)
$R_N$: Prime vertical radius of curvature of the Earth's surface(East-West)
$\varphi, \lambda, h$: Latitude, longitude and height, respectively
$f^n, f^e, f^d$: Specific forces in east, north and up directions, respectively.
$R_{ij}$: Rotation matrix ($R_b^l$) elements from body to local level frame.
$\Delta t$: rate change of time Using the above dynamic model, measurements models may be implemented in EKF to provide frequent updates that are utilized to resent error states and to estimate the sensors' bias errors. Shin, E.-H. *Estimation Techniques for Low-Cost Inertial Navigation*; University of Calgary: Calgary, AB, Canada, 2005 describes more details about measurement models, and is incorporated herein by reference. In this work new measurement model has been developed specifically for pipeline navigation. The linearized measurement error model can be expressed as:

$$\delta z_k = H \delta x_k + \delta v_k \quad (18)$$

Where H is the design matrix and v is the measurement noise. Both process and measurement noises are assumed to be white and uncorrelated to each other.

Pitch & Heading Measurement Model

The heading of the PIG 102 in the PIG 104 is computed from the elements of the following DCM:

$$\hat{R}_v^l = \hat{R}_b^l (R_b^v)^T \quad (11)$$
$$= [-I - \Psi] R_b^l (R_b^v)^T$$
$$= \begin{bmatrix} \hat{a}_{11} & \hat{a}_{12} & \hat{a}_{13} \\ \hat{a}_{21} & \hat{a}_{22} & \hat{a}_{23} \\ \hat{a}_{31} & \hat{a}_{32} & \hat{a}_{33} \end{bmatrix}$$

where ($R_j^k$) represents the DCM from (j) to (k) frames, (b, l, v) represent the IMU body, local level (navigation), and vehicle (pig) frames, respectively. The rotation matrix from the body to vehicle (pig) frame is calculated after installing the IMU in the pig. $R_b^v$ is constant and does not change. ($\Psi$) represents the skew-symmetric matrix of the rotation vector pertaining to the error of the attitude DCM and can be expressed as follows:

$$\Psi = \begin{bmatrix} 0 & -\delta A & \delta p \\ \delta A & 0 & -\delta r \\ -\delta p & \delta r & 0 \end{bmatrix} \quad (12)$$

Let $b_{ij}$ and $c_{ij}$ represent the $ij^{th}$ elements of $R_b^v$ and $R_b^l$, respectively. The $R_b^l$ can be written as follows:

$$R_b^l = \begin{bmatrix} \cos p \cos A & -\cos r \sin A + \sin r \sin p \cos A & \sin r \sin A + \cos r \sin p \cos A \\ \cos p \sin A & \cos r \cos A + \sin r \sin p \sin A & -\sin r \cos A + \cos r \sin p \sin A \\ -\sin p & \sin r \cos p & \cos r \cos p \end{bmatrix} \quad (13)$$

From Equation 19, the required $\hat{a}_{ij}$ elements to be used for heading and pitch angles calculation can be expressed as follows:

$$\hat{a}_{11} = \begin{matrix} b_{11}(c_{11} + c_{21}\delta A - c_{31}\delta p) + \\ b_{12}(c_{12} + c_{22}\delta A - c_{32}\delta p) + \\ b_{13}(c_{13} + c_{23}\delta A - c_{33}\delta p) \end{matrix} \quad (14)$$

$$\hat{a}_{21} = \begin{matrix} b_{11}(c_{21} + c_{31}\delta r - c_{11}\delta A) + \\ b_{12}(c_{22} + c_{32}\delta r - c_{12}\delta A) + \\ b_{13}(c_{23} + c_{33}\delta r - c_{13}\delta A) \end{matrix}$$

$$\hat{a}_{31} = \begin{matrix} b_{11}(c_{31} + c_{11}\delta p - c_{21}\delta r) + \\ b_{12}(c_{32} + c_{12}\delta p - c_{22}\delta r) + \\ b_{13}(c_{33} + c_{13}\delta p - c_{23}\delta r) \end{matrix}$$

-continued $$\hat{a}_{32} = \begin{matrix} b_{21}(c_{31} + c_{11}\delta p - c_{21}\delta r) + \\ b_{22}(c_{32} + c_{12}\delta p - c_{22}\delta r) + \\ b_{23}(c_{33} + c_{13}\delta p - c_{22}\delta r) \end{matrix}$$

$$\hat{a}_{33} = \begin{matrix} b_{31}(c_{31} + c_{11}\delta p - c_{21}\delta r) + \\ b_{32}(c_{32} + c_{12}\delta p - c_{22}\delta r) + \\ b_{33}(c_{33} + c_{13}\delta p - c_{23}\delta r) \end{matrix}$$

From Equation 21, heading and pitch can be calculated as follows:

$$A = \tan^{-1} \frac{\sin A}{\cos A} \quad (15)$$
$$= \tan^{-1} \frac{a_{21}}{a_{11}}$$

$$p = \tan^{-1} \frac{\sin p}{\cos p} \quad (16)$$
$$= \tan^{-1} \frac{-a_{31}}{\sqrt{a_{32}^2 + a_{33}^2}}$$

Similarly, the estimated heading and pitch angles can be calculated from Equation 19 as follows:

$$\hat{A} = \tan^{-1} \frac{\sin \hat{A}}{\cos \hat{A}} \quad (17)$$
$$= \tan^{-1} \frac{\hat{a}_{21}}{\hat{a}_{11}}$$

$$\hat{p} = \tan^{-1} \frac{\sin \hat{p}}{\cos \hat{p}} \quad (18)$$
$$= \tan^{-1} \frac{-\hat{a}_{31}}{\sqrt{\hat{a}_{32}^2 + \hat{a}_{33}^2}}$$

In an embodiment, the heading and pitch angles do not change in the pipeline piece; the change in these angles may be zero. Therefore, the approximated changes of heading and pitch angles model can be expressed as follows:

$$\delta z_{p,A}^v = \hat{\in} - \tilde{\in} \quad (19)$$

where $\hat{\in}$ is the computed heading and pitch vector, and $\tilde{\in}$ is the measured heading and pitch vector.

The measurement design matrix can be expressed as follows:

$$H_{p,A} = \begin{bmatrix} \frac{\partial \hat{p}}{\partial \delta r} & \frac{\partial \hat{p}}{\partial \delta p} & \frac{\partial \hat{p}}{\partial \delta A} \\ \frac{\partial \hat{A}}{\partial \delta r} & \frac{\partial \hat{A}}{\partial \delta p} & \frac{\partial \hat{A}}{\partial \delta A} \end{bmatrix} \quad (20)$$

The design matrix elements are expanded in the appendix. Finally, the innovation sequence of EKF at each epoch can be calculated as follows:

$$e_k = \delta z_{p,A}^v - H_{p,A} \delta x \quad (21)$$

where $\delta x_k$ represents the error state vector $[\delta r\ \delta p\ \delta A]^T$.

TABLE 1

| MEMS - IMU Specifications | | |
| --- | --- | --- |
| | Gyroscope | Accelerometer |
| Bias Repeatability (1σ) | ≤100°/hr | ≤10 mg |
| Bias Instability | ≤6°/hr | ≤0.5 mg |
| Random Walk | ≤0.5°/√hr | ≤0.5 m/s/√hr |

For a comparison purpose, the proposed algorithm has been applied for two different scenarios: scenario #1 is processed IMU & Odometer data using one AGM (after 30 min); and scenario #2 is processed IMU & Odometer data using no AGM. In both scenarios, the position of the first and last point of the trajectory are known. The first point represents the PIG pipeline inlet and the last point is the PIG pipeline outlet.

Scenario #1

In this scenario, one AGM has been added after 20 mins of starting motion. The AGM provides position update (CUPT). FIG. 13 shows both solutions, the EKF based and EKF/PLJ based. Where both solutions are compared against the reference trajectory. It is noticeable that the EKF/PLJ proposed solution showed an improvement over the stand-alone EKF solution which can be noticed in FIGS. 14A-C which illustrate the north, east, and height positions RMS errors, respectively, for both methods. Maximum and RMS position errors (in meters) for both solutions are shown by bar graphs in FIG. 15 and FIG. 16, respectively.

Scenario #2:

Scenario #2 is similar to scenario #1 without adding any AGM. Directly from the output trajectory, the difference between both solutions is clear as shown in FIG. 17. The actual positions errors are shown in FIGS. 18A-C.

As shown by the bar graph in FIG. 19. and FIG. 20, the developed EKF/PLJ method greatly improved the accuracy of the results. EKF/Odometer integration for pipeline navigation using the developed method of EKF/PLJ had maximum position error of 11.59 m in north direction, and EKF/Odometer solution only had maximum position error of 76.41 m in same direction. This is an overall average improvement of 85%

Despite all the improvements in the north and east positions, it is noticeable from all of the above bar graphs, the height errors are increased using the EKF/PLJ method. However, such and error can't affect the total solution for the PIG 104 whereas the depth of the pipelines under the earth surface can varies between (1-5 m) only. Therefore, the north and east positions are considered more important.

Finally, the results can be summarized as shown in Table 2 and Table 3 where North, East & Height maximum and RMS errors for both scenarios are shown.

TABLE 2

| North, East & Height Errors Maximum Error | | | | |
| --- | --- | --- | --- | --- |
| Method | | North (m) | East (m) | Height (m) |
| Scenario #1 | EKF | 31.99 | 72.89 | 3.28 |
| | EKF/PLJ | 11.83 | 10.77 | 7.03 |
| Scenario #2 | EKF | 76.41 | 51.94 | 1.99 |
| | EKF/PLJ | 11.59 | 8.48 | 5.99 |

TABLE 3

| North, East & Height Errors RMS Error | | | | |
| --- | --- | --- | --- | --- |
| Method | | North (m) | East (m) | Height (m) |
| Scenario #1 | EKF | 17.7 | 25.05 | 1.61 |
| | EKF/PLJ | 7.11 | 5.80 | 2.91 |
| Scenario #2 | EKF | 46.72 | 34.58 | 1.03 |
| | EKF/PLJ | 7.35 | 5.91 | 2.31 |

In this section results of FOG based IMU (LN200) are demonstrated. The IMU specifications are shown in Table 4.

TABLE 4

| LN200s - IMU Specifications | | |
| --- | --- | --- |
| | Gyroscope | Accelerometer |
| Bias Repeatability (1σ) | 0.5°/hr | 300 μg |
| Random Walk | 0.05°/√hr | 0.34 m/s/√hr |
| Size (mm) | Diameter (88.9) | |
| | Height (85.1) | |

The data of this experiment has been collected for 36 inch diameter pig with a velocity average around 0.4 m/s. No reference trajectory has been provided for this test, however, 10 AGMs coordinates have been provided. The pig ran in the pipeline for 21.42 hours and traveled about 31.24 km.

FIG. 21 illustrates the full trajectory results for LN200 IMU. The "+" markers are the above ground markers. The area inside the rectangle is zoomed and illustrated in FIG. 20.

The 3D error has been calculated at the AGM markers by calculating the differences between the position of the AGM and the position of the filtering solution at the same time. Table 5 shows all combined errors that includes latitude errors, longitude errors, height errors, 2D errors, and 3D errors.

FIG. 22 illustrates both AGM #2 and AGM #3. As shown in Table 5, the 3D error at AGM #2 has been reduced from 40.215 (m) to 14.88 (m) using EKF/PLJ algorithm.

TABLE 5

| LN200 - Errors | | | | | | |
| --- | --- | --- | --- | --- | --- | --- |
| AGM # | Model | Latitude Error (m) | Longitude Error (m) | Height Error (m) | 2D Error (m) | 3D Error (m) |
| 1 | EKF | 0.039 | 0.087 | 0.203 | 0.096 | 0.224 |
| | EKF/PLJ | 0.038 | 0.089 | 0.141 | 0.097 | 0.171 |
| 2 | EKF | 31.36 | 23.22 | 9.728 | 39.021 | 40.215 |
| | EKF/PLJ | 25.02 | 7.863 | 9.746 | 26.220 | 27.97 |
| 3 | EKF | 18.913 | 0.246 | 31.762 | 18.915 | 36.967 |
| | EKF/PLJ | 7.092 | 13.9 | 31.793 | 15.605 | 35.416 |
| 4 | EKF | 4.591 | 6.563 | 15.465 | 8.009 | 17.416 |
| | EKF/PLJ | 4.564 | 6.549 | 15.371 | 7.983 | 17.32 |
| 5 | EKF | 1.259 | 10.356 | 32.224 | 10.432 | 33.87 |
| | EKF/PLJ | 1.622 | 8.212 | 32.216 | 8.371 | 33.286 |
| 6 | EKF | 5.251 | 1.927 | 10.911 | 5.593 | 12.261 |
| | EKF/PLJ | 5.255 | 1.918 | 10.911 | 5.594 | 12.261 |
| 7 | EKF | 0.186 | 0.062 | 0.015 | 0.196 | 0.197 |
| | EKF/PLJ | 0.186 | 0.062 | 0.015 | 0.196 | 0.197 |
| 8 | EKF | 33.823 | 6.237 | 39.881 | 34.393 | 52.663 |
| | EKF/PLJ | 33.788 | 6.287 | 39.881 | 34.368 | 52.646 |
| 9 | EKF | 0.022 | 0.064 | 0.045 | 0.068 | 0.081 |
| | EKF/PLJ | 0.022 | 0.064 | 0.045 | 0.068 | 0.081 |
| 10 | EKF | 1.968 | 1.985 | 16.157 | 2.795 | 16.397 |
| | EKF/PLJ | 2.12 | 2.105 | 16.156 | 2.988 | 16.430 |

FIG. 23 shows the effect of EKF/PLJ algorithm for a short period. It is noticeable that the aliasing appeared using EKF algorithm have been removed.

Two different scenarios have been discussed as results for real pipeline data that has been collected using MEMS-IMU based system. These results show that this method is capable of reducing the trajectory navigation RMS error by about 80% over one hour of operation and without using any AGM along the PIG journey.

Beneficially, the described embodiments increase the accuracy of pipeline navigation. Based on the reality of constructing the pipelines (i.e. straight shapes), and how they are connecting to each other, pipeline junctions have been modeled and included as new measurement model to update the estimation algorithm. The described methods decrease the total required AGMs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method to enhance pipeline trajectory reconstruction using pipeline junctions, the method comprising:
   collecting sensor data with a microelectromechanical system (MEMS) inertial sensor comprising an accelerometer onboard a Pipeline Inspection Gauge (PIG) device, the sensor data including acceleration data obtained by the accelerometer;
   detecting a pattern in the acceleration data using a processing device configured to receive the sensor data from the MEMS inertial sensor, the pattern being indicative of a junction characteristic in the pipeline;
   determining a rate of travel of the PIG device; and
   determining a position of the PIG device within the pipeline in response to a combination of the identified junction characteristic and the rate of travel of the PIG device, wherein determining the position of the PIG device further comprises applying orientation updates by selectively applying an Extended Kalman Filter (EKF) to the sensor data generated by the MEMS inertial sensor located onboard the PIG device in response to the junction characteristic.

2. The method of claim 1, further comprising identifying bending and straight segments of the pipeline.

3. The method of claim 2, wherein identifying the bend further comprises determining an angular rate of motion of the PIG device along a plurality of non-parallel axes.

4. The method of claim 3, wherein determining the angular rate of motion comprises collection information from a gyroscopic sensor device.

5. The method of claim 2, wherein the determination of the position of the PIG device is updated in response to the identified bending and straight segments of the pipeline.

6. The method of claim 1, wherein collecting the sensor data further comprises collecting data from a plurality of sensor devices in an inertial measurement unit (IMU).

7. The method of claim 6, wherein collecting the sensor data further comprises collecting gyroscopic data from a plurality of MEMS gyroscopic sensor in the IMU.

8. The method of claim 6, wherein collecting the sensor data further comprises collecting acceleration data from a plurality of MEMS accelerometers in the IMU.

9. The method of claim 1, wherein collecting the senor data further comprises collecting rate of travel information from an odometer sensor.

10. A system, comprising:
    a Pipeline inspection Gauge (PIG) device;
    a Micro-Electro-Mechanical System (MEMS) Inertial Measurement Unit (IMU) onboard the PIG device configured to generate sensor data indicative of motion of the PIG device, wherein the IMU further comprises a plurality of MEMS accelerometers configured to provide acceleration data; and
    a processing device coupled to the IMU, the processing device configured to:
       detect a pattern in the acceleration data indicative of a junction characteristic in the pipeline;
       determine a rate of travel of the PIG device; and
       determine a position of the PIG device within the pipeline in response to a combination of the identified junction characteristic and the rate of travel of the PIG device, wherein determining the position of the PIG device further comprises applying orientation updates by selectively applying an Extended Kalman Filter (EKF) to the sensor data generated by the MEMS inertial sensor located onboard the PIG device in response to the junction characteristic.

11. The system of claim 10, wherein the PIG is further configured to identify bending and straight segments of the pipeline.

12. The system of claim 11, wherein identifying the bend further comprises determining an angular rate of motion of the PIG device along a plurality of non-parallel axes.

13. The system of claim 12, wherein determining the angular rate of motion comprises collecting information from a gyroscopic sensor device.

14. The system of claim 11, wherein the determination of the position of the PIG device is updated in response to the identified bending and straight segments of the pipeline.

15. The system of claim 10, wherein the IMU is configured to collect the sensor data from a plurality of sensor devices in the IMU.

16. The system of claim 15, wherein the IMU further comprises a plurality of MEMS gyroscopic sensors configured to provide the sensor data for collection.

17. The system of claim 10, further comprising an odometer sensor configured to provide rate of travel information.

* * * * *